(12) United States Patent
Cooper et al.

(10) Patent No.: US 10,107,314 B2
(45) Date of Patent: Oct. 23, 2018

(54) CYLINDER HAVING A FLOATING PISTON, LOW PROFILE SWIVEL CAP, AND LUBRICATED ROD

(71) Applicant: SPX Corporation, Charlotte, NC (US)

(72) Inventors: James Ervin Cooper, Menomonee Falls, WI (US); Weijiang Chen, Machesney Park, IL (US)

(73) Assignee: SPX Flow, Inc., Charlotte, NC (US)

( * ) Notice: Subject to any disclaimer, the term of this patent is extended or adjusted under 35 U.S.C. 154(b) by 619 days.

(21) Appl. No.: 14/643,940

(22) Filed: Mar. 10, 2015

(65) Prior Publication Data

US 2015/0184682 A1  Jul. 2, 2015

Related U.S. Application Data

(63) Continuation-in-part of application No. 14/338,102, filed on Jul. 22, 2014, now Pat. No. 9,856,892, which
(Continued)

(51) Int. Cl.
*F15B 15/14* (2006.01)
*F16C 11/06* (2006.01)
(Continued)

(52) U.S. Cl.
CPC ............ *F15B 15/1447* (2013.01); *B66F 3/38* (2013.01); *F15B 15/1457* (2013.01);
(Continued)

(58) Field of Classification Search
CPC .......... F15B 15/00; F15B 15/02; F15B 15/20; F15B 15/26; F15B 15/1447;
(Continued)

(56) References Cited

U.S. PATENT DOCUMENTS 470,397 A   3/1892   Jerome
737,639 A   9/1903   Lewis et al.
(Continued)

FOREIGN PATENT DOCUMENTS

CN   1062021   6/1992
CN   1040144   10/1998
(Continued)

OTHER PUBLICATIONS

International Search Report dated Aug. 28, 2014, in corresponding Appl. No. PCT/US2014/033772.
(Continued)

*Primary Examiner* — Jonathan P Masinick
(74) *Attorney, Agent, or Firm* — Baker & Hostetler LLP

(57) ABSTRACT

A swivel assembly for an actuator includes: a rod defining a socket, the rod defining an arcuate surface at the floor of the socket; a cap dimensioned to fit into the socket, the cap defining a convex arcuate surface dimensioned to correspond to the arcuate surface of the floor of the socket; a first extended surface defined by the rod, the first extended surface, defined at least in part, by side portions of the socket providing depth to the socket; a second extended surface defined by the cap providing an extended length to the cap to allow the cap to extend out of the socket when the convex arcuate surface of the cap contacts the arcuate surface of the floor of the socket; and a cylinder assembly operatively connected to a piston and the cap to permit the piston and cap to move axially along a longitudinal axis of the cylinder assembly to move inwardly and outwardly of the cylinder assembly.

17 Claims, 17 Drawing Sheets

Related U.S. Application Data is a continuation-in-part of application No. 14/250,615, filed on Apr. 11, 2014, now Pat. No. 9,784,290.

(60) Provisional application No. 62/027,350, filed on Jul. 22, 2014, provisional application No. 62/027,289, filed on Jul. 22, 2014, provisional application No. 61/811,575, filed on Apr. 12, 2013.

(51) Int. Cl.
    *B66F 3/38* (2006.01)
    *F16C 23/04* (2006.01)

(52) U.S. Cl.
    CPC ........... *F16C 11/06* (2013.01); *F16C 11/0666* (2013.01); *F16C 23/048* (2013.01); *Y10T 29/49826* (2015.01); *Y10T 403/32057* (2015.01)

(58) Field of Classification Search
    CPC .............. F16C 11/0623; F16C 11/0647; F16C 11/0619; Y10T 403/32606; Y10T 403/32622
    See application file for complete search history.

(56) References Cited

U.S. PATENT DOCUMENTS

| | | | |
|---|---|---|---|
| 986,029 | A | 3/1911 | Steinert |
| 1,434,904 | A | 11/1922 | Mansfield |
| 2,503,659 | A | 4/1950 | Curtis et al. |
| 3,006,606 | A | 10/1961 | Pohl et al. |
| 3,053,595 | A | 9/1962 | Dilworth |
| 3,096,986 | A | 7/1963 | David |
| 3,168,853 | A | 2/1965 | Prince |
| 3,759,146 | A | 9/1973 | Brotherton |
| 4,173,329 | A | 11/1979 | Stith, Jr. |
| 4,457,212 | A | 7/1984 | Unger et al. |
| 4,653,339 | A | 3/1987 | Komatsu et al. |
| 5,442,993 | A | 8/1995 | Baliotti, II et al. |
| 5,509,748 | A | 4/1996 | Idosako et al. |
| 6,152,640 | A | 11/2000 | Oda et al. |
| 6,290,235 | B1 | 9/2001 | Albertson |
| 6,386,088 | B1 | 5/2002 | Yoshimoto et al. |
| 7,040,812 | B2 | 5/2006 | Boshier et al. |
| 7,343,846 | B2 | 3/2008 | Stanford et al. |
| 2005/0013658 | A1 | 1/2005 | Muders et al. |
| 2006/0260462 | A1 | 11/2006 | Stanford et al. |
| 2011/0170943 | A1* | 7/2011 | Su ....................... F16C 11/0619 403/74 |
| 2013/0199327 | A1 | 8/2013 | Park et al. |
| 2014/0102293 | A1 | 4/2014 | Miller et al. |
| 2014/0308066 | A1 | 10/2014 | Cooper |
| 2015/0184682 | A1 | 7/2015 | Cooper et al. |
| 2015/0233396 | A1 | 8/2015 | Cooper et al. |

FOREIGN PATENT DOCUMENTS

| | | |
|---|---|---|
| CN | 1287228 | 3/2001 |
| CN | 1759254 | 4/2006 |
| DE | 1 151 428 | 7/1963 |
| DE | 32 45 186 A1 | 6/1984 |
| EP | 1270958 | 1/2003 |
| WO | 2004081377 | 9/2004 |
| WO | 2009/103762 A1 | 8/2009 |
| WO | 2010/142606 A2 | 12/2010 |
| WO | 2014169194 | 10/2014 |
| WO | 2016014667 | 1/2016 |

OTHER PUBLICATIONS

Written Opinion of the International Searching Authority dated Aug. 28, 2014, in corresponding Appl. No. PCT/US2014/033772.
European Search Report issued in European Patent Application No. 14782340.5 dated Nov. 4, 2016.
International Search Report issued in International Patent Application No. PCT/US15/41540 dated Oct. 13, 2015.
International Search Report issued in International Patent Application No. PCT/US15/41535 dated Oct. 13, 2015.
"Round Flat Washers & Shims Search" Seastrom Manufacturing Co., Inc. [online] Nov. 2, 2013. Retrieved Sep. 16, 2015. Retrieved from Internet: <https://web.archive.org/web/20131102145103/http://seastrom-mfg.com/washersearch.aspx)>; p. 1.
International Search Report (ISR) (PCT Form PCT/ISA/210) in International Patent Application No. PCT/US15/41525 dated Oct. 16, 2015.
Chinese Office Action dated Aug. 2, 2016.
U.S. Office Action dated Dec. 1, 2016, in U.S. Appl. No. 14/338,102.
U.S. Office Action dated Oct. 5, 2015, in U.S. Appl. No. 14/250,615.
United Kingdom Search Report dated Aug. 10, 2016, in Great Britain Patent Application No. GB 1604073.5.

* cited by examiner

CYLINDER HAVING A FLOATING PISTON, LOW PROFILE SWIVEL CAP, AND LUBRICATED ROD

CROSS-REFERENCE TO RELATED APPLICATIONS

This application claims priority to, and is a continuation-in-part application of pending U.S. patent application entitled, Cylinder Having a Floating Piston, Swivel Cap and Lubricated Rod, filed Jul. 22, 2014, application Ser. No. 14/338,102 which claims priority to and is a continuation-in-part application of, pending application Ser. No. 14/250,615 titled Swivel Cap filed Apr. 11, 2014 which, in turn, claims priority to and the benefit of provisional U.S. patent application entitled, Swivel Cap, filed Apr. 12, 2013, having a Ser. No. 61/811,575. This application also claims the benefit of provisional U.S. patent application entitled, Actuation Rod Lubrication System and Method, filed Jul. 22, 2014 having a Ser. No. 62/027,350. This application also claims the benefit of provisional U.S. patent application entitled, A Floating Piston, filed Jul. 22, 2014, having a Ser. No. 62/027,289. Priority to each of these applications is claimed and the disclosures of each of these applications are hereby incorporated by reference in their entirety.

TECHNICAL FIELD

This patent disclosure relates generally to actuators and, more particularly, to swivel caps and floating pistons for rods used in actuators to reduce bending moments and reduce side movement.

BACKGROUND

An actuator is a mechanism often used to lift or move an object or to clamp an object to prevent motion. An actuator may introduce linear or non-linear motion. Examples of actuators include hydraulic cylinders, pneumatic cylinders, electrical motors, and etc. Actuators are used in many applications, including construction equipment, engineering vehicles and manufacturing machinery. For example, the hydraulic cylinder is a mechanical actuator that may provide a unidirectional force through a unidirectional stroke. The hydraulic cylinder consists of a cylinder in which a piston connected to a rod moves back and forth.

Actuators suffer from disadvantages or drawbacks associated with the misalignment of the load in relation to the centerline or axis of the cylinder. This misalignment may be the result of setting poorly balanced or off-center loads with respect to the centerline or axis of the cylinder. This may occur for example, when the rod contacts an uneven surface. This problem may cause damage to the cylinder and the cylinder may ultimately fail.

Much effort has been made by manufacturers of hydraulic cylinders to reduce or eliminate the side loading of cylinders created as a result of misalignment. It is almost impossible to achieve perfect alignment of a hydraulic cylinder, even though the alignment of the cylinder has a direct impact on the longevity of the hydraulic cylinder. Actuators for many applications are custom made and expensive so prolonging their life and operation can represent significant savings.

Many hydraulic cylinders involve an internal piston that is moved back and forth along the length of the cylinder. An actuation rod is often attached to the cylinder and the rod moves in and out of the cylinder as the piston moves. The actuation rod is often connected to the structure outside of the cylinder that moves when the rod moves. Often, a wiper is located near the end of the piston into which the rod enters. The wiper is used to clean the rod of dirt, debris, and any foreign matter before the rod enters the hydraulic cylinder.

Inside of the hydraulic cylinder is a seal that is often used to seal against the rod and prevent hydraulic fluid from the hydraulic cylinder from moving out the hydraulic cylinder along with the rod. However, a drawback of the seal is that the rod is dried once it moves past the seal and therefore is not lubricated as the rod moves past or rubs the structure of the hydraulic cylinder as it moves in and out of the cylinder.

A lack of lubrication along the rod, as it moves past the structure of the hydraulic cylinder, can create wear on the surface of the rod. This wear problem can be exacerbated when the rod is subject to side loads. Side loads may occur where forces acting on the rod in a direction not axial with the rod. These side loads can cause the rod to rub against the structure of the hydraulic cylinder as the rod moves in and out of the hydraulic cylinder.

Accordingly, it is desirable to provide a method and apparatus that provides lubrication for the rod.

These prior art methods and systems, however, have not sufficiently reduced or eliminated bending moments that cause stress on the rod and ultimately lead to rod failure. Therefore, there is a need for actuators that can operate to reduce bending moments that can potentially cause the cylinder assembly to fail.

The presently disclosed system and method is directed at overcoming one or more of these disadvantages in currently available actuators.

SUMMARY

In accordance with some embodiments of the present disclosure, a swivel assembly for an actuator includes: a rod defining a socket, the rod defining an arcuate surface at the floor of the socket; a cap dimensioned to fit into the socket, the cap defining a convex arcuate surface dimensioned to correspond to the arcuate surface of the floor of the socket; a first extended surface defined by the rod, the first extended surface, defined at least in part, by side portions of the socket providing depth to the socket; a second extended surface defined by the cap providing an extended length to the cap to allow the cap to extend out of the socket when the convex arcuate surface of the cap contacts the arcuate surface of the floor of the socket; and cylinder assembly operatively connected to a piston and the cap to permit the piston and the cap to move axially along a longitudinal axis of the cylinder assembly to move inwardly and outwardly of the cylinder assembly.

In accordance with some embodiments of the present disclosure, a method of reducing a bending moment in a cylinder assembly includes: providing a first extended surface to elongated socket to give the socket additional depth into a rod; providing a second extended surface on a cap having a convex arcuate surface and dimensioning the second extended surface and the convex arcuate surface to fit into the socket; placing the cap into the socket; providing a top surface on the cap; operatively connecting the first and cap to a piston and cylinder assembly wherein the piston has a bearing surface against the sidewall of the cylinder assembly; and orienting the socket to minimize a distance between the top surface of the cap and the bearing surface of the piston when the cap is located in the socket.

In accordance with some embodiments of the present disclosure, a swivel assembly for an actuator includes: a rod defining a socket, the rod defining an arcuate surface at the floor of the socket; a cap dimensioned to fit into the socket, the cap defining a convex arcuate surface dimensioned to correspond to the arcuate surface of the floor the socket; a means for extending a depth of the socket; a means for extending the convex arcuate surface to allow the cap to fit within the extended socket; and means for extending and contracting the first and second bodies away from and toward an actuating cylinder.

In this respect, before explaining at least one embodiment of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
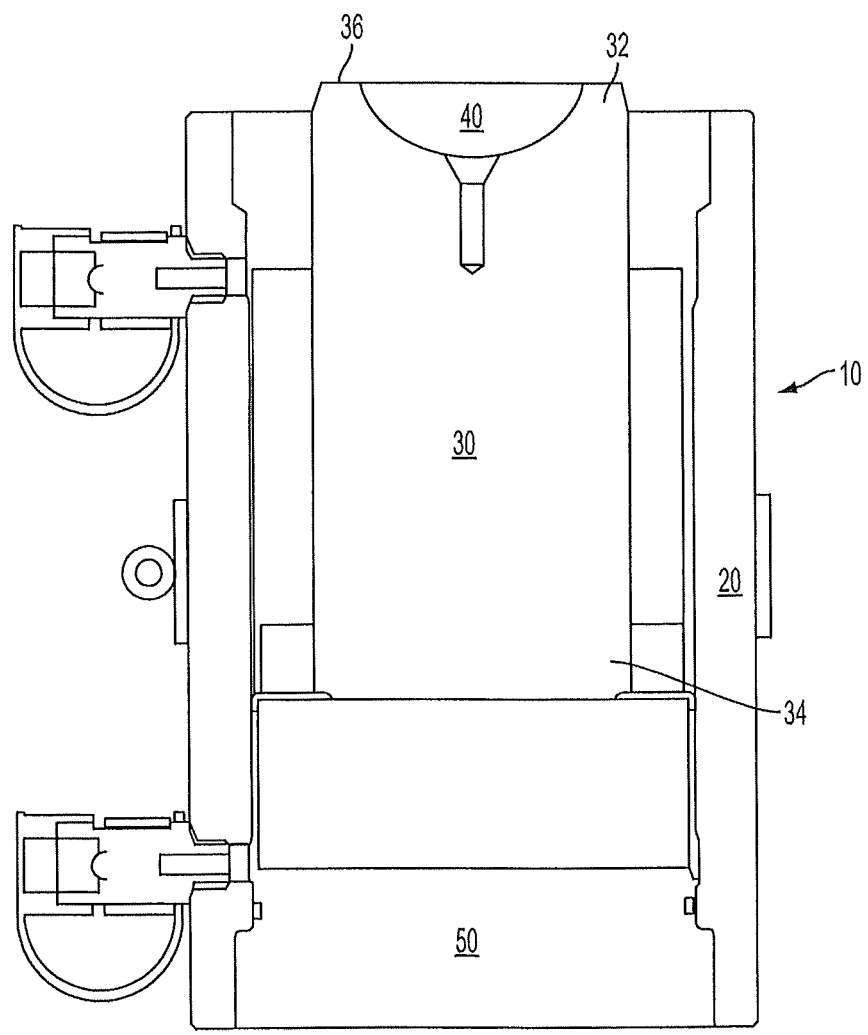
FIG. 1 presents a cross sectional view of an actuator showing the rod and the socket portion in accordance with the present disclosure.

Referring now to FIG. 1, a cross sectional view of an actuator 10 according to the present disclosure is shown. The actuator 10 shown and discussed below is a hydraulic cylinder assembly. Although, the disclosure is not meant to be limited to a hydraulic cylinder. The principles of the disclosure may be applied to other types of actuators, such as hydraulic, pneumatic, electric and any other type of actuator.

The hydraulic cylinder assembly 10 has a barrel or cylinder 20 and a rod 30. The rod 30 is slidably received in the barrel 20 and extends through the barrel 20. The rod 30 has two ends 32, 34. The rod 30 has a socket portion 40 at one end 32. The actuator 10 has a base 50 near the end 34 opposing the socket portion 40. In some embodiments according to the present disclosure, the rod 30 may be cylindrical. Other geometries, however, may be used for the rod 30. In the present disclosure, the term rod 30 is used to refer to the rod and is also used to refer to a single piece that combines the piston and rod. The socket portion 40 of the rod 30 may be a separate attachment to the rod 30. Alternatively, the rod 30 may be fabricated as a single piece with the socket portion 40.

Figure 2:
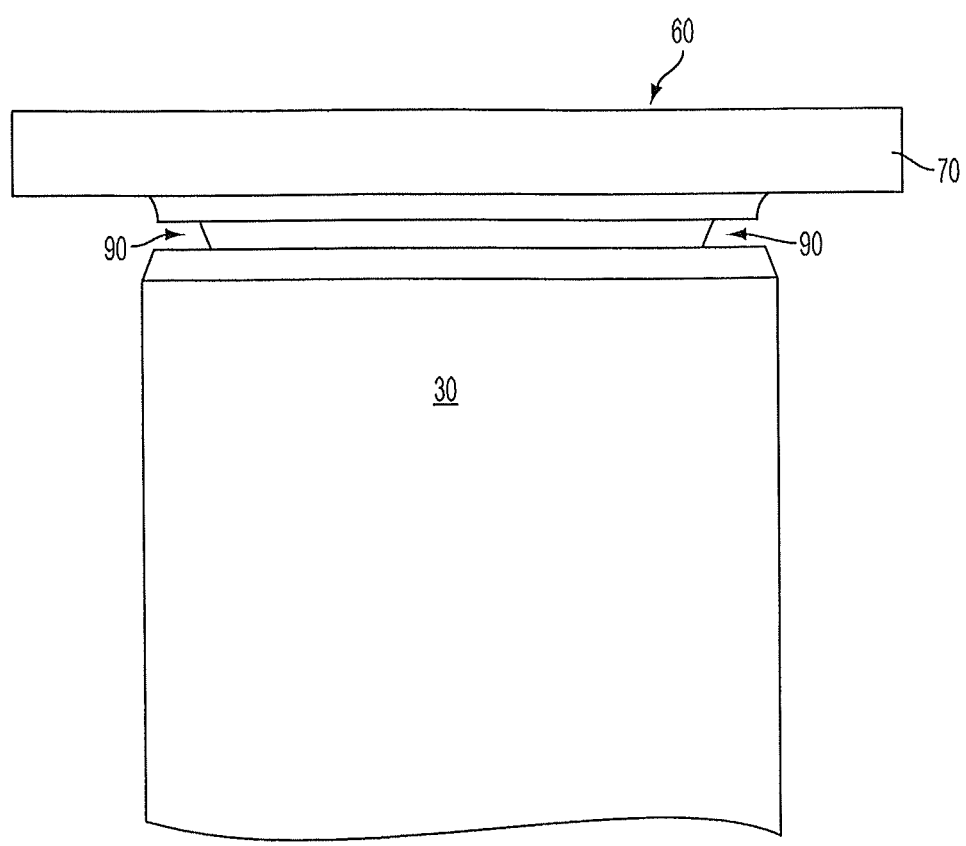
FIG. 2 presents a side view of a swivel cap shown with the rod in accordance with the present disclosure.
Figure 3:
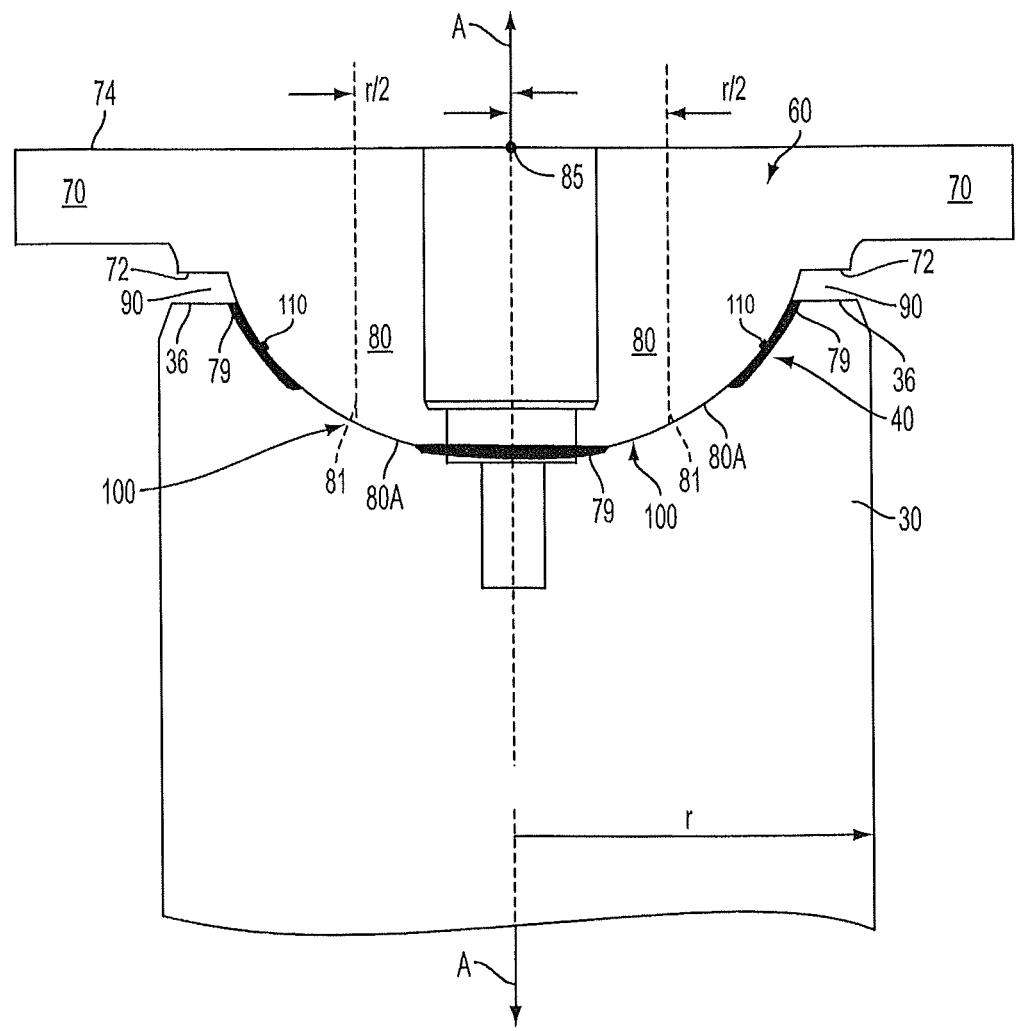
FIG. 3 presents a cross-sectional view of a swivel cap in accordance with the present disclosure.

The hydraulic cylinder assembly 10 also has a swivel cap 60. A perspective view of the swivel cap 60 and a distal end the rod 30 is shown in FIG. 2. A cross-sectional view of the swivel cap 60 with a distal end of the rod 30 is shown in FIG. 3.

Figure 4:
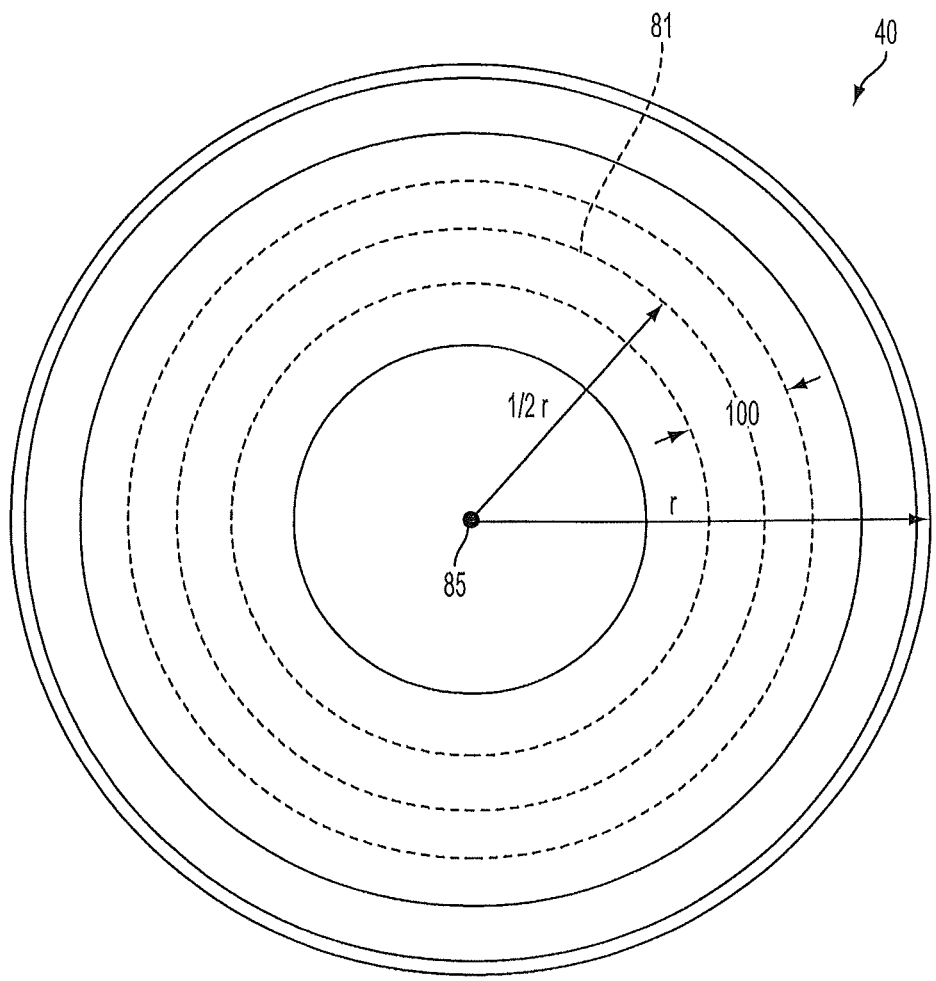
FIG. 4 presents a top view of the socket portion of the rod in accordance with the present disclosure.

The swivel cap 60 includes a base portion 70 and a raised dome portion 80. The base portion 70 of the swivel cap 60 has an inner surface 72 and an outer surface 74. As shown in FIGS. 3 and 4, the raised domed portion 80 of the swivel cap 60 is disposed on the inner surface 72 of the base portion 70. The raised domed portion 80 may be mounted in the socket portion 40 of the rod 30. The base portion 70 and the raised dome portion 80 are typically formed from a metal such as steel and may be formed from the same material that is used to form the rod 30. Other materials, however, may be used to form the base portion 70 and the raised dome portion 80 as long as the materials selected have sufficient strength for the cylinder assembly 10 application. The base portion 70 may be circular.

The raised domed portion 80 is dome-shaped or hemispherical and is shaped to accommodate the socket portion 40 (See FIG. 4) of the rod 30. The raised domed portion 80 of the swivel cap 60 has a central axis that is positioned generally in line with the axis A of the rod 30. The raised domed portion 80 has an origin of the radius 85, which is located on the plane that defines the outer surface 74 of the base portion 70. This particular location of the origin of the radius 85 provides zero side movement during the rotation of the swivel cap 60 and reduces the bending moments in the rod 30. The origin of the radius 85 of the raised domed portion 80 is along the central axis at the center of the plane that defines the outer surface of the base portion. The origin of the radius 85 is shown in FIGS. 3 and 4. The axis A is shown in FIG. 3.

In some embodiments according to the present disclosure, the base portion 70 is circular and the rod 30 is cylindrical. FIGS. 2 and 3 show a cylindrical rod 30 and a circular base portion 70. In some embodiments, the diameter of the base portion 70 less then, greater than, or equal to the diameter of the outer diameter of the rod 30. In FIGS. 2 and 3, the diameter of the base portion 70 is greater than the outer diameter of the rod 30.

It is generally desirable to have a base portion 70 that is larger than the planar face 36 of the rod 30 because the larger base portion 70 can protect the object that the actuator is acting upon. Often when an actuator 10 is in operation, the object that it is lifting, moving, or clamping may be damaged by stress and deformation by rod 30. The large base portion 70, however, can prevent this damage. Because the diameter of the circular base portion 70 is at least as large as the outer diameter of the cylindrical rod 30, the base portion 70 protects the distal end of the rod 30 and in particular the planar face 36 of the rod 30 at the distal end of the rod 30. Furthermore, given the geometry of the swivel cap 60 according to the present disclosure and the contact area of the dome portion 80, the size of base portion 70 will not affect the rating of the hydraulic cylinder assembly 10 nor will it adversely affect the performance of the hydraulic cylinder assembly 10. In some embodiments of the present disclosure, the ratio of the surface area of the base portion 70 to surface area of the planar face 36 of the rod 30 may vary from 1:1 to 2:1 or more.

As described above, hydraulic cylinder assemblies 10 experience difficulties due to angular misalignment of the load applied to the rod 30. This may be caused for example by overloading due to misalignment of the rod 30 during operation of the hydraulic cylinder assembly 10, which may be partly due to the direction of the load changing during a lift. The angular misalignment of the rod 30 causes bending moments in the rod 30 which will cause the rod 30 to fail and the cylinder assembly 10 to fail. Therefore, it is important to eliminate or at least reduce bending moments in the rod 30, such that the rod 30 does not fail and the hydraulic cylinder assembly 10 is operational for as long as possible.

The hydraulic cylinder assembly 10 includes a swivel cap 60, which is designed to protect the rod 30 from this damage due to angular misalignment. The swivel cap 60 is mounted to the end 32 of the rod 30. The swivel cap 60 tilts relative to the rod 30 in response to angular misalignment with a load to a tilt angle. In some embodiments according to the present disclosure, the tilt angle of the swivel cap 60 is less than or equal to 5 degrees. In other embodiments, cylinders may be designed for tilt angles exceeding 5 degrees.

The socket portion 40 is sized to accommodate the raised domed portion 80 of the swivel cap 60 and vice versa. FIG. 4 illustrates a top view of the socket portion 40 of the rod 30 in accordance with the present disclosure. The socket portion 40, however, is not shaped or sized to exactly fit the raised domed portion 80. For example, FIG. 3 shows that a gap 90 is formed between the planar face 36 of the end 32 of the rod 30 and the inner surface 72 of the swivel cap 60.

The gap 90 provides a visual indication for the user of the hydraulic cylinder assembly 10 to know when the maximum tilt angle has been violated. This is important because the rod 30 may become damaged if the rod 30 is operated at a tilt angle beyond the maximum tilt angle. As the swivel cap 60 tilts in response to the angular misalignment of the rod 30, a portion of the inner surface 72 of the base portion 70 will contact the planar face 36 of the rod 30 when the swivel cap 60 tilts at or exceeds the maximum tilt angle. The gap 90 will close where the contact occurs between the inner surface 72 of the base portion 70 and the planar face 36 of the rod 30. A gap 90, however, remains between the remaining portions of the inner surface 72 of the base portion 70 (i.e., the portions that do not contact the planar surface of the rod) and the planar face 36 of the rod 30. In other words, the gap 90 will not be uniform between the base portion 70 and the planar face 36 of the rod as the swivel cap 60 rotates/tilts.

The user of the hydraulic assembly 10 will be able to visually detect during operation whether or not the maximum tilt angle has been reached or exceeded because the gap 90 will disappear at some portion of the inner surface 72 of the base portion 70. This feature allows the user to stop the operation of the hydraulic cylinder assembly 10 before the rod 30 is damaged.

If the rod 30 is operated such that the swivel cap 60 tilts at a tilt angle that is greater than the maximum tilt angle, then the inner surface 72 of the base portion 70 will form a dent or depression in the planar face 36 of the rod 30. Alternatively, the dent or depression may occur on the inner surface 72 of the base portion 70. This dent or depression is caused by the contact between the base portion 70 and the planar surface of the rod 30. Alternatively, the dent or depression may occur on the inner surface 72 of the base portion 70. The magnitude of the dent will be a function of the load and the amount of misalignment. The rod's planar surface and/or the base portion's inner surface 72 can then be inspected to reveal whether or not the hydraulic cylinder assembly 10 was operated beyond its load specifications.

Therefore, the gap 90 ultimately provides two advantages for the user of the hydraulic cylinder assembly 10. First, the user of the hydraulic cylinder assembly 10 has a visual indicator for the maximum tilt during use. Second, the dent or depression provided on the rod 30 will indicate that rod 30 was operated beyond its load specifications. Knowing whether or not, a rod 30 is being operated within its design specifications can be useful information for both the user and the manufacturer. For example, if the rod 30 is being operated within its design specifications, then there will be no dent and any failure in the rod may be due to manufacturing defect. On the other hand, a dent indicates that the load specifications for the hydraulic cylinder assembly 10 have been violated and any rod failure was caused by the user.

The swivel cap 60 according to the present disclosure is designed to have a minimal amount of contact with the rod 30. The raised domed portion 80 of the swivel cap 60 contacts the rod 30 at the socket portion 40. The contact between the socket portion 40 and the raised domed portion 80 is limited to a certain area within the socket portion 40 of the rod 30. The contact area 80A is located within the socket portion 40 of the rod and can be seen in FIG. 3.

The swivel cap 60 may further include a raised region 100 that is located on either the raised domed portion 80 or the socket portion 40. In some embodiments, the raised region 100 is on the raised domed portion 80. In other embodiments, the raised region 100 may be on the socket portion 40 as shown in FIG. 3. The raised region 100 may have a center portion 81 located at about one half the length (r/2) of the radius (r) from the axis A of the swivel cap 60. The size and specific geometry of the raised region 100 may vary depending on how much contact is desired between the swivel cap 60 and the socket portion 40 of the rod 30.

The raised region 100 may be a region of the raised domed portion 80 that is raised from the outer surface of the raised domed portion 80. Alternatively, the raised region 100 may be a region within the socket portion 40 that is raised from the surface 79 of the socket portion 40. The raised region 100 is significant because it facilitates reducing the contact between the socket portion 40 and the raised domed portion 80. As explained further below, minimizing and controlling this contact area controls the bending moments and ultimately prolongs the service life of various components of the cylinder assembly 10 (See FIG. 1).

If the contact area was, for example, the entire surface area of the socket portion 40 of the rod 30, then the rod 30 would experience more bending moments and there would be a greater chance the rod 30 would fail under the stress of the bending moments. However, by minimizing the contact area between the raised domed portion 80 of the swivel cap 60 and the socket portion 40 of the rod 30, the bending moments are controlled and the rod 30 experiences less stress thereby reducing the chance of rod 30 failure.

The swivel cap 60 is able to tilt to a certain extent relative to the rod 30 in response to a load. This tilting may take place about the origin of the radius 85 and between the contact surfaces 80A. The swivel cap 60 is able to keep the loads in the center of the rod 30, through the contact surface 80A. The contact surface 80A controls or limits the bending moment through the cylinder assembly 10, thereby reducing the chances that the rod 30 will become damaged or fail.

The axis (as shown by axis A of FIG. 3) of raised domed portion 80 of the swivel cap 60 is positioned generally coaxial with the axis A of the rod 30. The origin of the radius 85 of the raised domed portion 80 is along axis A and positioned on the outer surface 74 of the base portion 70.

There may be one or more tilt indicators 110 that are located on the outer surface of the raised domed portion some distance above the contact surface 80A. In some embodiments, there may be two tilt indicators 110 that is a circular groove as shown in FIG. 3. Because the tilt indicators 110 are located outside of the contact surface 80A, any sign of damage or stress above the tilt indicator 110 shows that the hydraulic cylinder assembly 10 has been operated beyond its load specifications. Conversely, any sign of damage or stress below the tilt indicators 110 shows that the hydraulic cylinder assembly 10 has been operated within load specifications.

In some embodiments according to the present disclosure, the hydraulic cylinder assembly 10 may include a seal (not shown). The seal may be an annular contamination seal and may be disposed around the raised domed portion 80. The seal may be useful to prevent the entry of dirt or debris from entering socket portion 40 and raised domed portion 80.

An embodiment in accordance with the present invention provides lubrication to a rod when the rod is urging against a bearing surface. In some embodiments, the lubrication system is configured so that neither the seal nor the wiper removes lubrication from the rod before the rod urges against the bearing surface of a retainer.

Figure 5:
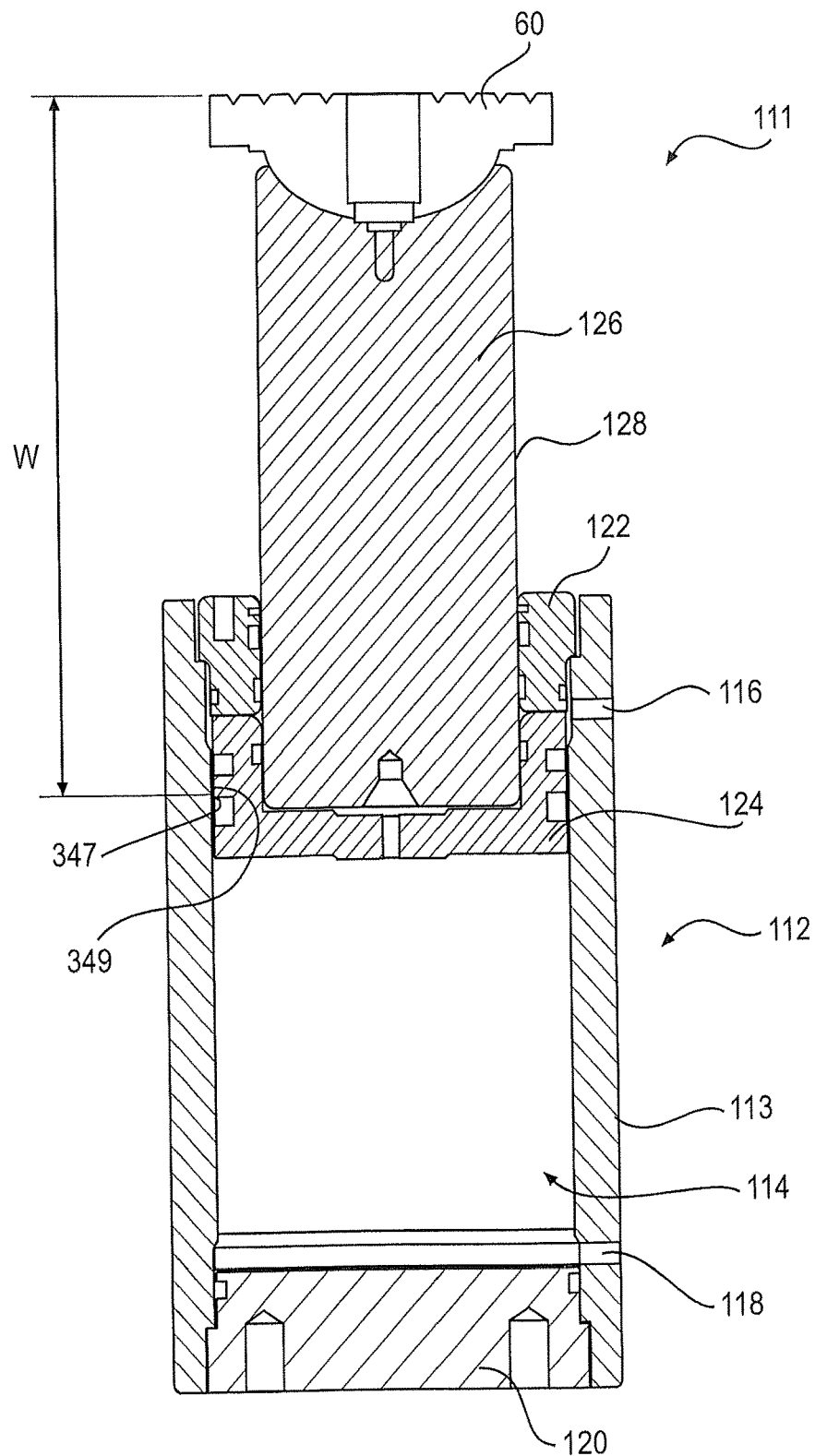
FIG. 5 is a cross-sectional view illustrating a hydraulic cylinder, piston, and rod where the piston is in a first position.
Figure 6:
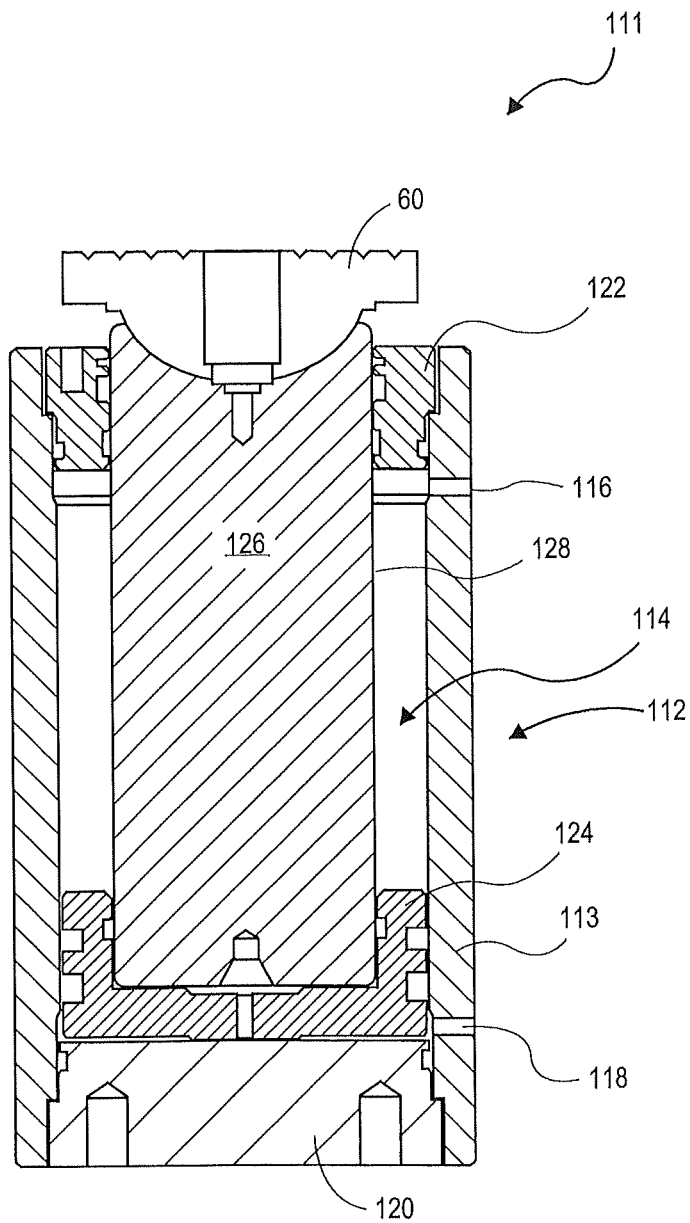
FIG. 6 is a cross-sectional view illustrating a hydraulic cylinder, piston, and rod where the piston is in a second position.

An embodiment of the present inventive apparatus is illustrated in FIGS. 5 and 6. FIGS. 5 and 6 illustrate a cross-sectional view of a hydraulic cylinder assembly 111. The hydraulic cylinder assembly 111 includes a hydraulic cylinder 112 having a housing 113. The hydraulic cylinder housing 113 defines an interior space 114. The hydraulic cylinder 112 contains a plug 120 and a retainer 122 to define a substantially fluid tight interior 114. The retainer 122 need not be a separate piece from the cylinder 112, but may be part of the cylinder 112 or housing 113 or some other feature.

A first port 116 and a second port 118 provide inlet/outlets for hydraulic fluid to enter or leave the interior 114 of the hydraulic cylinder 112.

When hydraulic fluid enters the second port 118 and exits the first port 116, the piston 124 is pushed upward as shown in FIG. 5. This causes the rod or shaft 126 to move out of the hydraulic cylinder 112. When hydraulic fluid enters the first port 116 and exits the second port 118, the piston is pushed downward as shown in FIG. 6. This causes the rod or shaft 126 to move into the hydraulic cylinder 112.

As the rod or shaft 126 moves in and out of the hydraulic cylinder 112, the rod 126 slides against the retainer 122. Often, the rod 126 is subjected to side loads or, in other words, loads that are not in line with the longitudinal axis of the rod 126. Side loads cause the rod 126 to urge against the retainer 122. Wear of the surface 128 of the rod 126 against the retainer 122 can cause damage to the surface 128 of the rod 126 and/or retainer 122. In order to reduce this wear, various embodiments in accordance with the present disclosure provide a method and system for lubricating the surface 128 of the rod 126.

Figure 7:
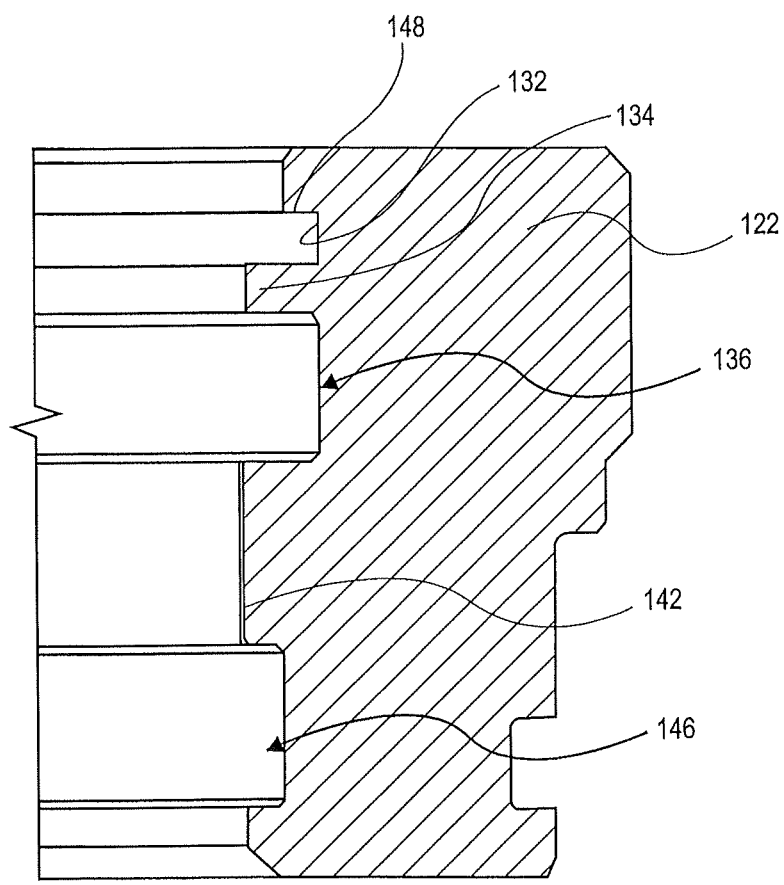
FIG. 7 is a partial cross-sectional view of a hydraulic piston retainer in accordance with an embodiment in accordance with the disclosure.

In some embodiments in accordance with the disclosure, a lubrication system is located in the retainer 122 to lubricate the surface 128 of the rod 126. FIG. 7 is a partial cross-sectional view of the retainer 122. One of ordinary skill in the art will understand that the retainer 122 is generally annular in shape. However, only a partial cross-sectional view is present in FIG. 7. The cross-sectional view shown in FIGS. 1 and 2 will communicate to one of ordinary skill in the art after reviewing this disclosure the annular shape of the retainer 122.

Figure 8:
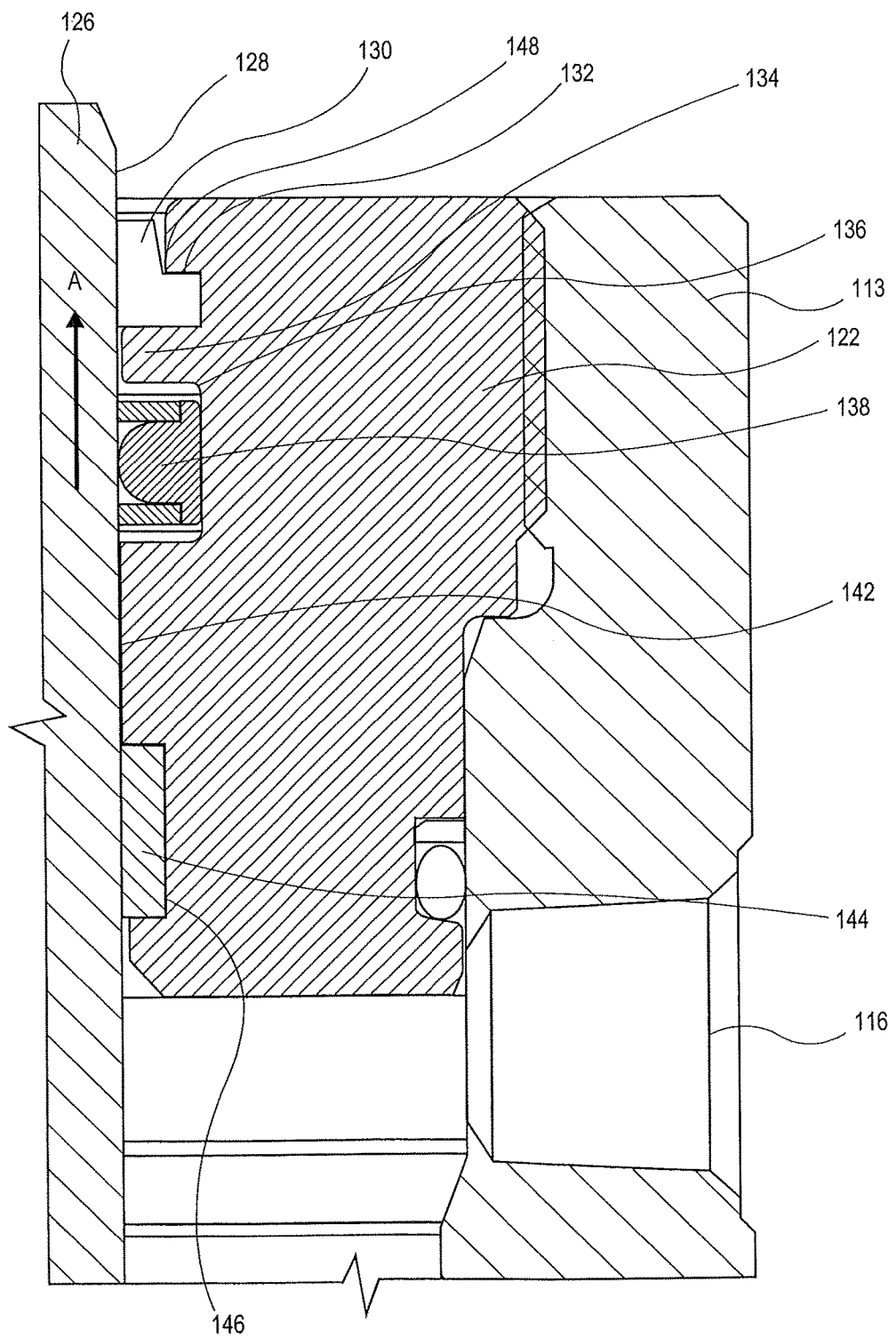
FIG. 8 is a partial cross-sectional view of a hydraulic piston retainer, and associated components in accordance with the disclosure.

Returning to FIG. 7, a wiper recess 132 is illustrated in the retainer 122. The wiper recess 132 is located just above a retaining lip 134. The retaining lip 134 provides structure in the retainer 122 to retain a seal 138 (as shown in FIG. 8) in place. FIG. 7 illustrates a recess 136 located in the retainer 122 into which the seal 138 (as shown in FIG. 8) resides. The retainer 122 includes a bearing surface 142. It is the bearing surface 142 which contacts and rubs against the surface 128 of the rod or shaft 126 (not shown in FIG. 7).

In some embodiments, in accordance with the present disclosure, the rod 126 does not rub against any other portion of the retainer 122 then the bearing surface 142.

As shown in FIG. 7, the bearing surface 142 and the retainer 122 define a cutout or groove 146. It is in the cutout or groove 146 that a lubrication system resides for lubricating the surface 128 of the rod 126.

FIG. 8 is a partial cross-sectional view of the retainer 122 along with other components set with in the retainer 122. In addition, the retainer 122 is shown placed in the hydraulic cylinder 112. The housing 113 is shown as well as in the rod 126. The surface 128 of the rod 126 is shown to be adjacent to the bearing surface 142 of the retainer 122.

A wiper 130 is illustrated in the wiper recess 132 of the retainer 122. The wiper 130 provides the function of cleaning off any dirt, debris, or any other foreign matter from the surface 128 of the rod 126 as the rod 126 enters the hydraulic cylinder 112. As shown in FIG. 8, the wiper 130 may have a step shape, thus providing a stepped portion 148 of the wiper recess 132.

The retainer lip 134 can be seen as located below the wiper 130. The retainer lip 134 provides structure within the retainer 122 to prevent the seal 138 from being forced out of the hydraulic cylinder 112 due to hydraulic pressure within the interior 114 of the hydraulic cylinder 112 or due to friction from the rod 126 moving out of the hydraulic cylinder 112.

The seal 138 resides in the seal recess 136 within the retainer 122. The seal 138 prevents hydraulic fluid from moving along the surface 128 of the rod 126 to exit the hydraulic cylinder 112. The seal 138 and the wiper 130 may be relatively well-known in the art and do not merit further discussion herein.

FIG. 8 also illustrates a lubrication system 144. In some embodiments, the lubrication system 144 simply consists of felt impregnated or saturated with a lubricant. The lubrication system 144 may simply be referred to as an oiler 144. In some embodiments, the lubricant may be lubricating oil. In other embodiments, the lubricant may be a hydraulic fluid used in the hydraulic cylinder 112. The oiled felt 144 resides in the lubricating system cutout 146 within the retainer 122. As shown in FIG. 8, the oiled felt 144 contacts the surface 128 of the rod 126. The oiled felt 144 is located below both the wiper 130 and the seal 138. This location results in the surface 128 of the rod being lubricated by the oiled felt 144 before the rod 126 moves in an outwardly direction illustrated by arrow A. Because the exterior 128 of the rod 126 is lubricated before the exterior 128 contacts the bearing surface 142, the exterior 128 of the rod 126 is lubricated as it moves out of the hydraulic cylinder 112 along the direction illustrated by arrow A.

In particular, the surface 128 of the rod 126 that is lubricated by various embodiments in accordance with the present disclosure, is illustrated in FIG. 8. FIG. 8 is a partial cross-sectional view of the retainer 122 showing also part of the rod 126 and the hydraulic cylinder housing 113.

The embodiment shown in FIG. 8 is suitable for single acting cylinders 112 where the single acting hydraulic cylinder 112 urges against a load when the rod 126 moves out of the hydraulic cylinder 112. The oiled felt 144 only applies a lubricant to the surface 128 of the rod 126 prior to the surface 128 of the rod 126 contacting the bearing surface 142 when the rod 126 is moving out of the hydraulic cylinder 112 as shown by arrow A. When such a hydraulic cylinder 112 has the rod 126 moving in towards the hydraulic cylinder 112, in the direction opposite of arrow A, then the lubricant or oil is not applied to the rod 126 prior to the rod 126 sliding along the bearing surface 142.

A dual acting hydraulic cylinder 112 experiences significant loads on the rod 126 when the rod 126 both moves out of the hydraulic cylinder 112 as indicated by arrow A and into the hydraulic cylinder 112 in a direction opposite of that shown by arrow A. Such dual acting cylinders 112 may benefit from the embodiment shown in FIG. 8. However, such hydraulic cylinders 112 will primarily only have the surface 128 of the rod 126 lubricated by the oiled felt 144 prior to the surface 128 of the rod 126 contacting the bearing surface 142 on the retainer 122 when the rod 126 is moving out of the hydraulic cylinder 112 as indicated by arrow A.

As can be appreciated by one of ordinary skill in the art, it may also be desirable to have a hydraulic cylinder assembly 111 that provides lubrication for the surface 128 of the rod 126 prior to the surface 128 of the rod 126 contacting the bearing surface 142 of the retainer 122. Such a hydraulic cylinder assembly 111 is illustrated in partial cross-section in FIG. 9.

Figure 9:
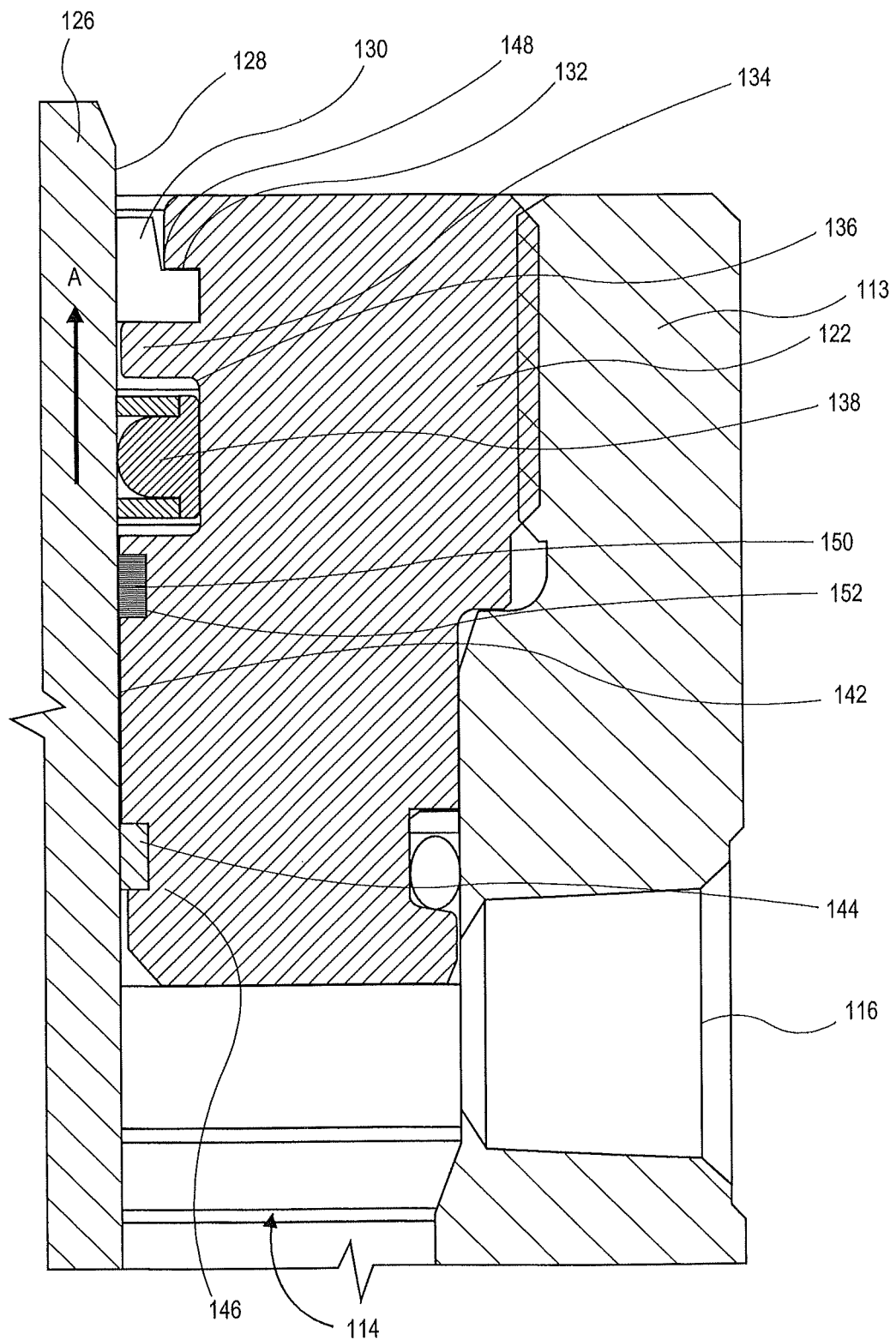
FIG. 9 is a partial cross-sectional view of a hydraulic piston retainer, and associated components in accordance with an embodiment having a second oiler in accordance with the disclosure.

FIG. 9 is similar to the configuration illustrated in FIG. 8. The retainer 122 is located in the housing 113 of the hydraulic cylinder 112. The inlet 116 is also shown providing access to the interior 114 of the hydraulic cylinder 112.

However, a second lubrication system which, in some embodiments, may be oiled felt 150 is located in a second lubrication groove 152 in the retainer 122 as illustrated. In the retainer 122 of the FIG. 9, a portion of the rod 126 is seen. The retainer 122 includes a wiper 130 located in the wiper recess 132 and the wiper 130 includes a stepped portion 148. The retainer 122 also includes a retaining lip 134 having a similar function as described above of retaining the seal 138 in the seal recess 136 as previously described. The retainer 122 includes a bearing surface 142. However, two lubrication systems which, in some embodiments, may include oiled felt 144 and 150 that reside in lubrication grooves 146 and 152 respectively.

As shown in FIG. 9, the lubrication system 144 is located below the bearing surface 142 in the retainer 122. Thus, as the surface 128 of the rod 126 moves out of the hydraulic cylinder 112 in the direction of arrow A, the surface 128 receives lubrication from the lubrication system 144 before contacting the bearing surface 142. In addition, the second lubrication system 150 provides lubrication to the surface 128 of the rod 126 before the surface 128 of the rod 126 rubs along the bearing surface 142 of the retainer 122 when the rod 126 moves into the hydraulic cylinder 112 in a direction opposite to that shown by arrow A. The two lubrication systems 144 and 150 are located below the bearing surface 142 and above the bearing surface 142 to provide the benefit of lubricating the surface 128 of the rod 126 prior to the surface 128 of the rod 126 rubbing against the bearing surface 142.

As can be appreciated from the discussion above, and as shown in the figures, some embodiments in the accordance of the present disclosure may include one lubrication system and others may use two. While the illustrated figures show a single lubrication system 144 located below the bearing surface 142 in other embodiments the single lubrication system may be located above the bearing surface 142 similar lubrication system 150. One of ordinary skill in the art after reviewing this disclosure may select an advantageous place to locate a lubrication system or systems for a given hydraulic cylinder.

While this disclosure has primarily discusses hydraulic cylinders, one of ordinary skill the art after reviewing this disclosure will understand that various principles of this disclosure may be applied to a variety of cylinders. For example, pneumatic cylinders, gas filled cylinders, liquid filled cylinders, or any other fluid filled cylinders that move a piston may be used in accordance with the disclosure herein. The principles described herein are not limited to hydraulic cylinders only that they are primarily discussed herein as an example.

An embodiment in accordance with the present disclosure is found in the accompanying figures. And actuator may include a piston and cylinder assembly similar to that shown. While the example described herein is a hydraulic cylinder, it will be understood principles of the present disclosure are not limited to hydraulic cylinders but may be used with pneumatic cylinders, gas filled cylinders, or any other type of cylinder or actuator.

An embodiment of the present inventive apparatus is illustrated in FIGS. 5 and 6. FIGS. 5 and 6 illustrate a cross-sectional view of a hydraulic cylinder assembly 111. The hydraulic cylinder assembly 111 includes a hydraulic cylinder 112 having a housing 113. The hydraulic cylinder housing 113 defines an interior space 114. The hydraulic cylinder 112 contains a plug 120 and a retainer 122 to define a substantially fluid tight interior 114. A first port 116 and a second port 118 provide inlet/outlets for hydraulic fluid to enter or leave the interior 114 of the hydraulic cylinder 112.

When hydraulic fluid enters the second port 118 and exits the first port 116, the piston 124 is pushed upward as shown in FIG. 5. This causes the rod or shaft 126 to move out of the hydraulic cylinder 112. When hydraulic fluid enters the first port 116 and exits the second port 118, the piston is pushed inward as shown in FIG. 6. This causes the rod or shaft 126 to move into the hydraulic cylinder 112.

As the rod or shaft 126 moves in and out of the hydraulic cylinder 112, the rod 126 slides against the retainer 122. Often, the rod 126 is subjected to side loads or, in other words, loads that are not in line with the longitudinal axis of the cylinder 112. Side loads cause the rod 126 to urge against the retainer 122. Wear of the surface 128 of the rod 126 against the retainer 122 can cause damage to the surface 128 of the rod 126 and/or retainer 122.

Figure 10:
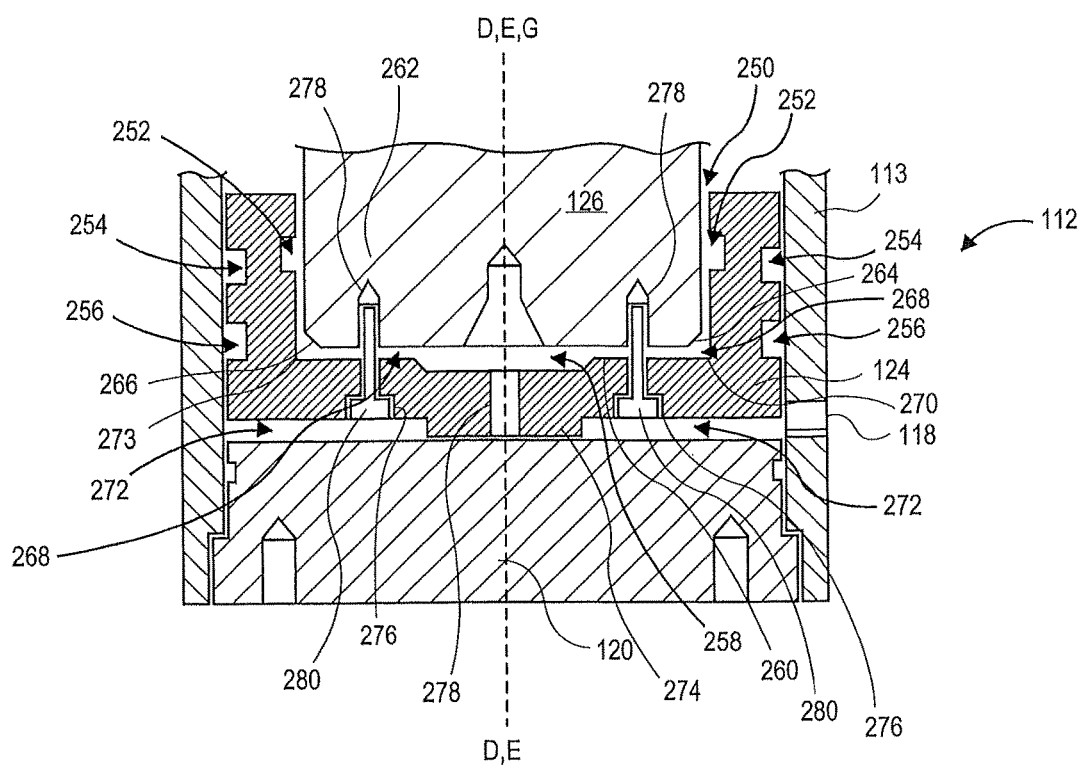
FIG. 10 is a partial cross-sectional view of a cylinder assembly showing additional detail.

FIG. 10 is an enlarged detailed partial cross-sectional view similar to that shown in FIG. 6. The rod 126 is seated in a socket portion 250 of the piston 124. The piston 124 may include various voids 252, 254, and 256. These voids 252, 254, and 256 may be used for various inserts such as piston seals or any other inserts. In other embodiments they may be left as voids or not be present. In still other embodiments, there may be more or fewer voids 252, 254 and 256 than as shown.

The piston 124 when seated against the plug 120 may also form a gap or clearance 272 between the piston 124 and the plug 120. This gap or clearance 272 may be a result of the projection 274 on the piston 124. The projection 274 prevents the piston 124 from moving completely against the plug 120. As a result, hydraulic fluid coming into the port 118 can fill into the gap 272 and exert force upwardly (as shown in FIG. 10) to move the piston 124 in an upward direction. If there were no gap 272, it would be difficult for fluid to urge against the piston 124 to lift the piston 124. In some embodiments, the projection 274 may cover about 10% of the surface area of the piston 124. In other embodiments the projection 274 may have different dimensions. After reviewing this disclosure, one of ordinary skill in the art will understand that the projection 274 could also be located on the plug 120 and achieve a similar result.

The socket portion 250 of the piston 124 may contain a seat void 258. The rod seat 260 may form the bottom of the socket portion 250. The piston end 262 of the rod 126 is fit with in the socket portion 250. The piston end 262 of the rod 126 may be chamfered as shown at sides 264 and 266 in FIGS. 10 and 12. When the piston end 262 of the rod 126 is fit with in the socket portion 250 of the piston 124, there is a clearance or void 268 between the seat 260 in the socket portion 250 of the piston 124 and the end 262 of the rod 126. The clearance void 268 extends to both seat corners 270 and 273. The clearance void 268 may be a result of loosely attaching the piston 124 to the rod 126.

As shown in FIG. 10, the piston 124 is attached to the rod 126 with fasteners 280 fit into fastener holes 276 in the piston 124 and fastener holes 278 located in the rod 126. In some embodiments, only the fasteners 280 and the fastener holes 278 in the rod 126 are threaded. The fasteners 280 are adjusted so that the gap 268 is at a desired amount. In some embodiments, the gap 268 may be about 0.015 inches. In other embodiments larger or smaller gaps may be used. In some embodiments, when attaching the piston 124 to the rod 126, the fasteners 280 are turned so that the piston 124 just contacts the rod 126 and then the fasteners 280 are backed out about a half turn to create a desired gap 268.

Figure 11:
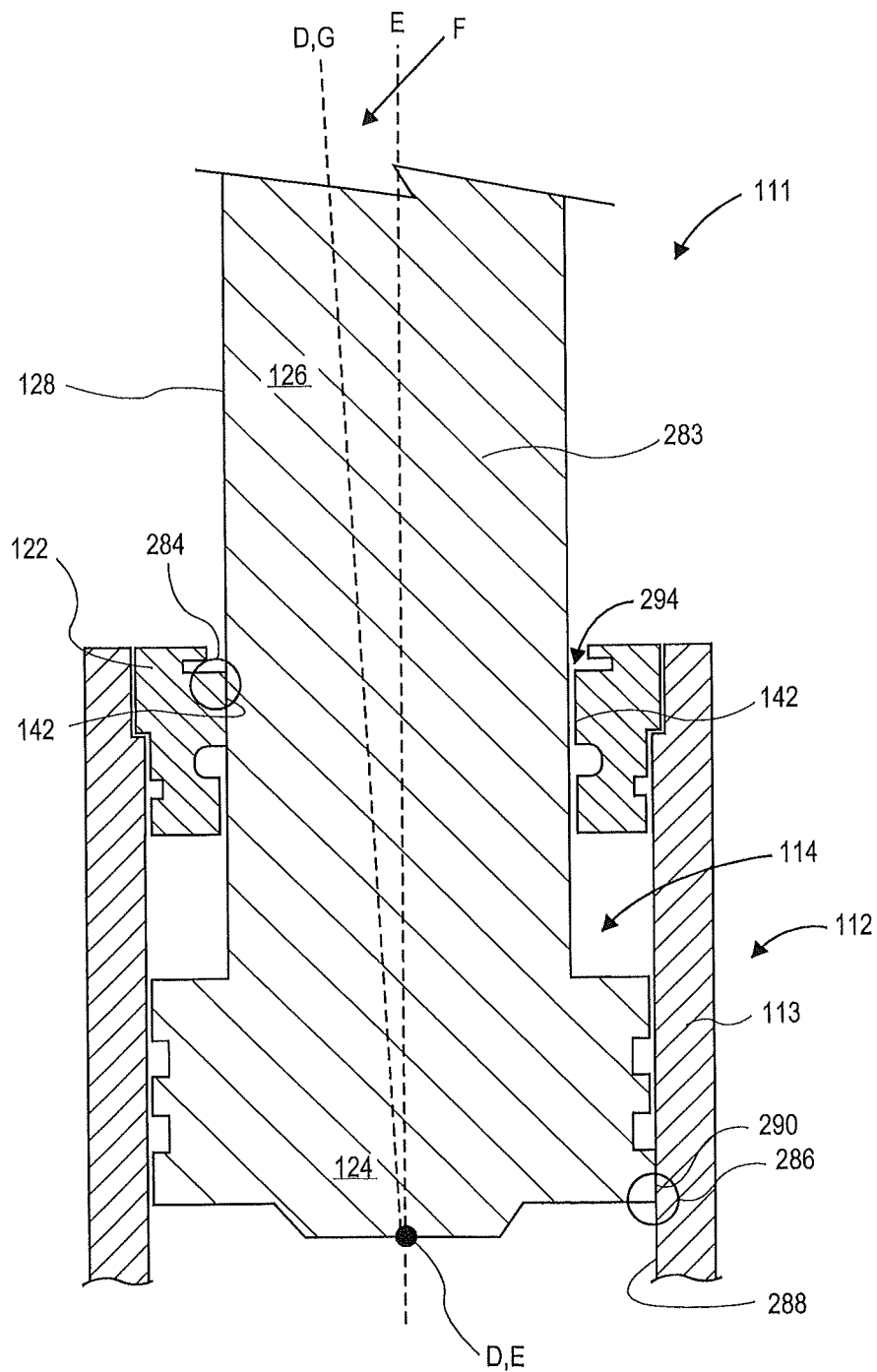
FIG. 11 is a partial cross-sectional view of a cylinder assembly.
Figure 12:
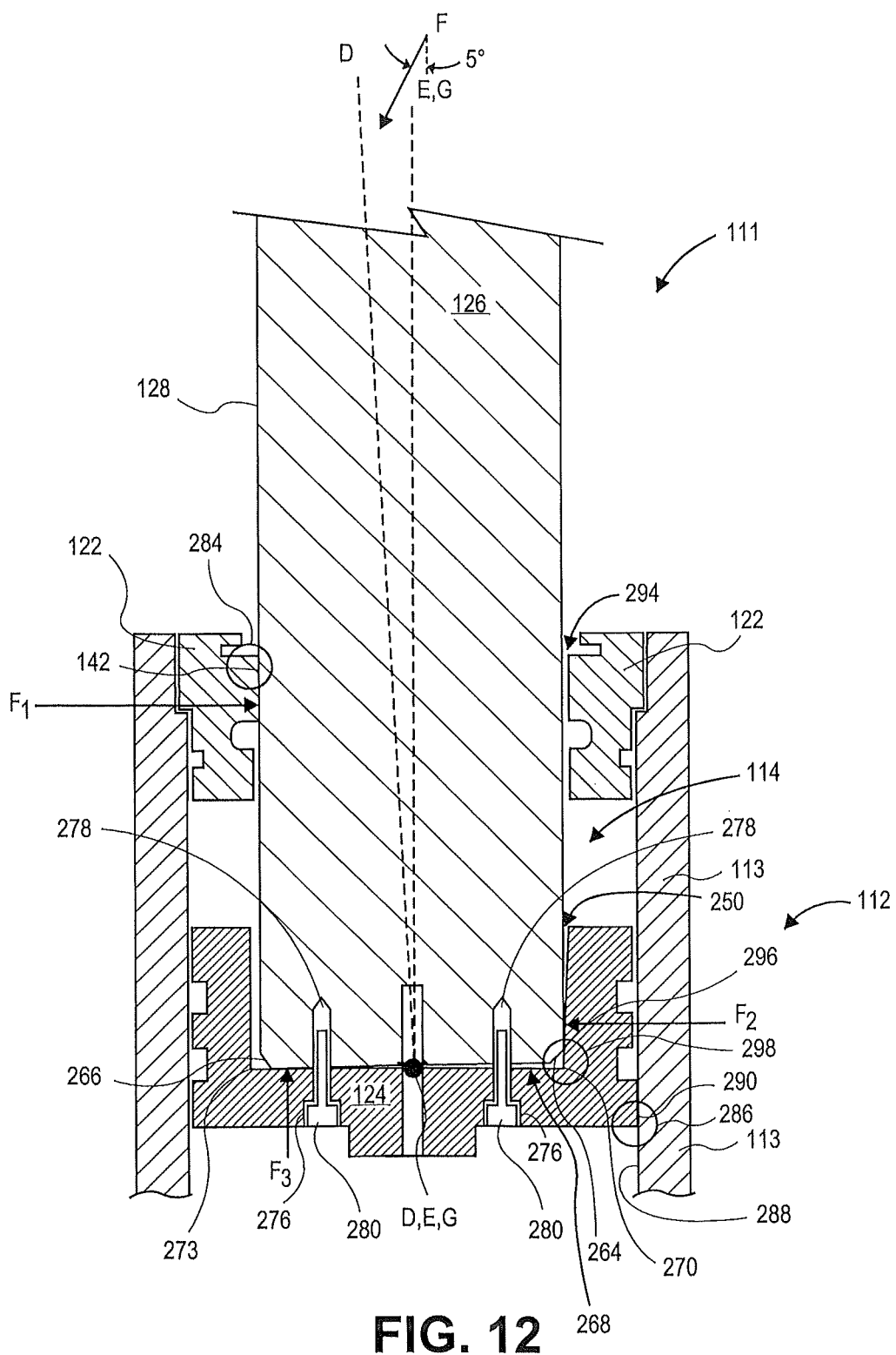
FIG. 12 is a partial cross-sectional view of a cylinder assembly.

FIG. 11 shows a piston assembly 111 not in accordance with the present disclosure. The piston assembly 111 shown in FIG. 11 represents a piston 124 and rod 126 that are unified together. The piston 124 and rod 126 may be unified because they are made of a single unitary part or they are unified because the piston 124 is attached to the rod 126 in a snug manner so that no gap 268 (as shown in FIGS. 10 and 12) exists.

The rod 126 will encounter a side load or, in other words a load that is not completely parallel with the axis E of the cylinder 112, causing the rod 126 and the piston 124 to be displaced. In FIG. 11, the side load force is represented by arrow F. The angle of arrow F is exaggerated to better illustrate the side load. The force of arrow F, causes the rod 126 to be displaced so that the axis D of the rod 126 and the axis G of the piston 124 are not parallel to the axis E of the interior 114 of the cylinder. Because the rod 126 and piston 124 are unified, it is assumed for the sake of this discussion that the axis D of the rod 126 and the axis G of the piston 124 are coaxial. Theoretically, if there were no side load force F and the hydraulic piston assembly 111 was manufactured to perfect dimensions, the axis D of the rod 126 the axis G of the piston 124 and the axis E of the interior 114 of the cylinder would be perfectly aligned. However this is never the case so a misalignment of the three axes D, G, and E is the rule rather than the exception.

Displacement of the rod 126 as a result of force F causes the surface 128 of the rod 126 to bear against the bearing surface 142 of the retainer 122. The bearing of the surface 128 of the rod 126 against the bearing surface 142 in the retainer 122 results in a retainer high stress area 284. As the rod 126 moves in or out and bears against the retainer 122, the surface 128 of the rod 126 may become scored, worn, or damaged as well as the surface 142 of the retainer 122.

On the opposite side of the rod 126 there is a gap 294 between the rod 126 and the bearing surface 142 of the retainer 122. In addition the piston 124 may also have a high stress area 286. In the piston high stress area 286, the wall 288 of the cylinder housing rubs against the bearing surface 290 on the piston 124. This may result in wear and scoring on either or both of the piston 124 and the wall 288 of the cylinder housing. Not only does this condition create undesirable wear, it can also reduce the efficiency and effectiveness of the cylinder assembly 111 due to energy being wasted in overcoming friction to move the piston 124 or rod 126 in the high stress areas 284, 286.

FIG. 12 is a partial enlarged cross-sectional view of a cylinder assembly 111 in accordance with the present disclosure. The rod 126 is loosely connected to the piston 124. This loose connection may sometimes be referred to as a floating piston 124. Arrow F represents a force acting in a direction not parallel to the cylinder axis E. The rod 126 is displaced by the side load of force F so that the exterior surface 128 of the rod 126 is pressed against the bearing surface 142 of the retainer 122 at the high stress area 284. On the opposite side of the rod 126 a gap 294 exists between the rod 126 and the retainer 122.

The piston 124 is squarely within the interior 114 of the cylinder 112 in contrast to what was shown in FIG. 11. As a result, the axis G of the piston is substantially parallel with the axis E of the cylinder 112. This is different than what was shown in FIG. 11. In FIG. 11 the rod axis D and the piston axis G were substantially coaxial. However in the embodiment shown in FIG. 12, the piston axis G is substantially parallel with the bore axis E. Making the piston axis G substantially parallel with the bore axis D allows the piston 124 to move in the interior 114 of the cylinder 112 without creating undue stress, wear, or have increased friction to move the piston 124 along the side wall 288.

As shown in FIG. 12, the piston 124 is squarely located within the interior 114 of the cylinder 112, and there is no undue binding in the area 286 between the bearing surface 290 on the piston 124 and the wall 288 of the cylinder 113. Instead, the rod 126 urges against an interior of the socket portion 250 of the piston 124. The side 264 of the rod 126 is pressed against the sidewall 296 of the socket portion 250 at stress area 298 as a result of force F. However the urging of the side 264 of the rod 126 against the sidewall 296 of the piston 124 does not create unnecessary wear binding because there is relatively little movement of the rod 126 with respect the piston 124 compared to the movement of the piston 124 against the sidewall 288 of the cylinder housing 113 such as that shown in FIG. 11. As a result, the wear on the sidewall 288 of the cylinder housing 113 is much reduced in FIG. 12 compared to the embodiment shown in FIG. 11. Furthermore, it requires less force or energy to move the piston 124 and rod 126 in and out through the interior 114 of the cylinder 113 then in the embodiment shown in FIG. 11.

The rod 126 still may have a clearance void 268 but the shape of that void 268 may be different or change depending upon the direction and amount of force F. One of ordinary skill the art would understand that the orientation of the rod 126 would change if the direction and/or amount of the force F also changed.

The chamfer at either side 266 and 264 or anywhere else around the circumference of the rod 126 may, in some embodiments, provide relief to allow the rod 126 to slightly pivot or otherwise move in the socket portion 250 of the piston 124. In some embodiments, a point identified in FIG. 12 is point D, E, G may exist where the rod axis D, the cylinder axis E, and the piston axis G intersect. In some embodiments this may be a point about which the rod 126 pivots as a result of force F.

One of ordinary skill in the art may understand after reviewing this disclosure that if force F is significant enough the rod 126 will pivot or move within the piston 124 and also cause the piston 124 to pivot or move within the interior 114 of the cylinder housing 113.

In some embodiments, the fasteners 280 may only be threadably attached to the rod 126 in the fastener holes 278 and not threadably attached to the faster holes 276 in the piston 124 to better facilitate pivoting movement of the rod 126 with respect to the piston 124.

Forces F1, F2, and F3 illustrated in FIG. 12 are reactionary forces resulting from the force F placed on the rod 126. As discussed above, when force F is applied to the rod 126, the rod 126 will pivot about point D,E,G. This movement will cause the rod 126 to contact the retainer 122 at stress area 284. Furthermore, the bottom of the rod 126 may slide to the right as shown in FIG. 12 toward corner 270. The rod 126 will also contact the piston 124 at stress area 298. This contact will result in reactionary forces acting upon the rod 126. For example force F1 is a reactionary force that the retainer 122 will impart upon the rod 126. Force F2 is a reactionary force the piston 124 will impart upon the side of the rod 126. Force F3 represents a force that the piston 124 will impart to the rod 126. One of ordinary skill in the art will understand that the reactionary forces as illustrated as F1, F2, and F3 are mere representations of forces which are distributed along an area and not only at discrete points as shown. The reactionary forces F1, F2, and F3 will create a bending moment to counteract the force F imparted to the rod 126. One advantage of the floating piston design is that due to the relative movement between the piston 124 and the rod 126 reactionary force F3 is created in reaction to force F. The presence of F3 results in the magnitude of F1 and F2 being smaller to react to force F than if F3 was not present.

In particular, reactionary force F3 will create a bending moment which will result in a lower stress in stress areas 284, 286, and 296 between the rod 126 and the retainer 122, the rod 126 and the piston 124, and the piston 124 and the housing 113, then would be found in an embodiment shown in FIG. 11 operating under a similar side load F. As a result, the embodiment shown in FIG. 12 provides certain advantages compared to the embodiment of FIG. 11.

In addition to reducing stress, the embodiment of FIG. 12 also reduces wear between the piston 124 and the housing 113. The wear is reduced because the high stress contact area is static between the rod 126 and the piston 124 which is in contrast, to the embodiment of FIG. 11 where the high stress area is dynamic between the piston 124 and the housing 113 of the cylinder 112. In the embodiment of FIG. 12, at the dynamic surface between the piston 124 and the housing 113 of the cylinder 112 the stress is reduced due to the piston 124 being able to better align within the cylinder 112 even when the rod 126 is out of alignment due to a side load F.

Some embodiments of hydraulic piston assemblies 111 (as shown, for example, in FIGS. 5 and 6) may include the combination of both a swivel cap 60 as described above and a floating piston 124 as described above. In embodiments where both swivel caps 60 and floating pistons 124 are incorporated into the hydraulic piston assembly 111, a user may find that the hydraulic piston assembly 111 may operate with significantly greater efficiency, impart less stress on various components, and drastically reduce wear. In some embodiments, some users may find a synergistic effect in the hydraulic piston assemblies 111 that incorporate both swivel cap 60 and floating piston 124. For example, if incorporating a swivel cap 60 to a hydraulic piston assembly results in an increase in performance of the hydraulic piston assembly by an amount of "X" and incorporating a floating piston in a hydraulic piston assembly results in increased performance by an amount of "Y," hydraulic piston assemblies 111 having both a swivel cap 60 and floating piston 124 may have an increased performance greater than "X" plus "Y." Thus, combining the swivel cap 60 with the floating piston 124 can yield unexpected results of better than anticipated performance levels.

Other embodiments may also incorporate a rod lubrication system as described above into a hydraulic piston assembly having one or both of a swivel cap 60 and a floating piston 124. However, other embodiments may incorporate a rod lubrication system as described above into a hydraulic piston assembly having neither a swivel cap nor a floating piston 124.

FIGS. 13-17 illustrate cylinder assemblies 10 according to the additional embodiments. One of ordinary skill in the art will understand after reviewing this disclosure that FIGS. 13-17 are cross-sectional views of circular objects. As such, features that appear on the right and/or on the left may actually be a single feature located circumferencely about the various objects shown. One of ordinary skill in the art will understand after reviewing this disclosure that cylinders, rods, and other such features are often circular in shape when viewed from a top view. Aspects of the invention are not limited to only circular shaped cylinders and rods but may be applied to features having a variety of shapes.

Figure 13:
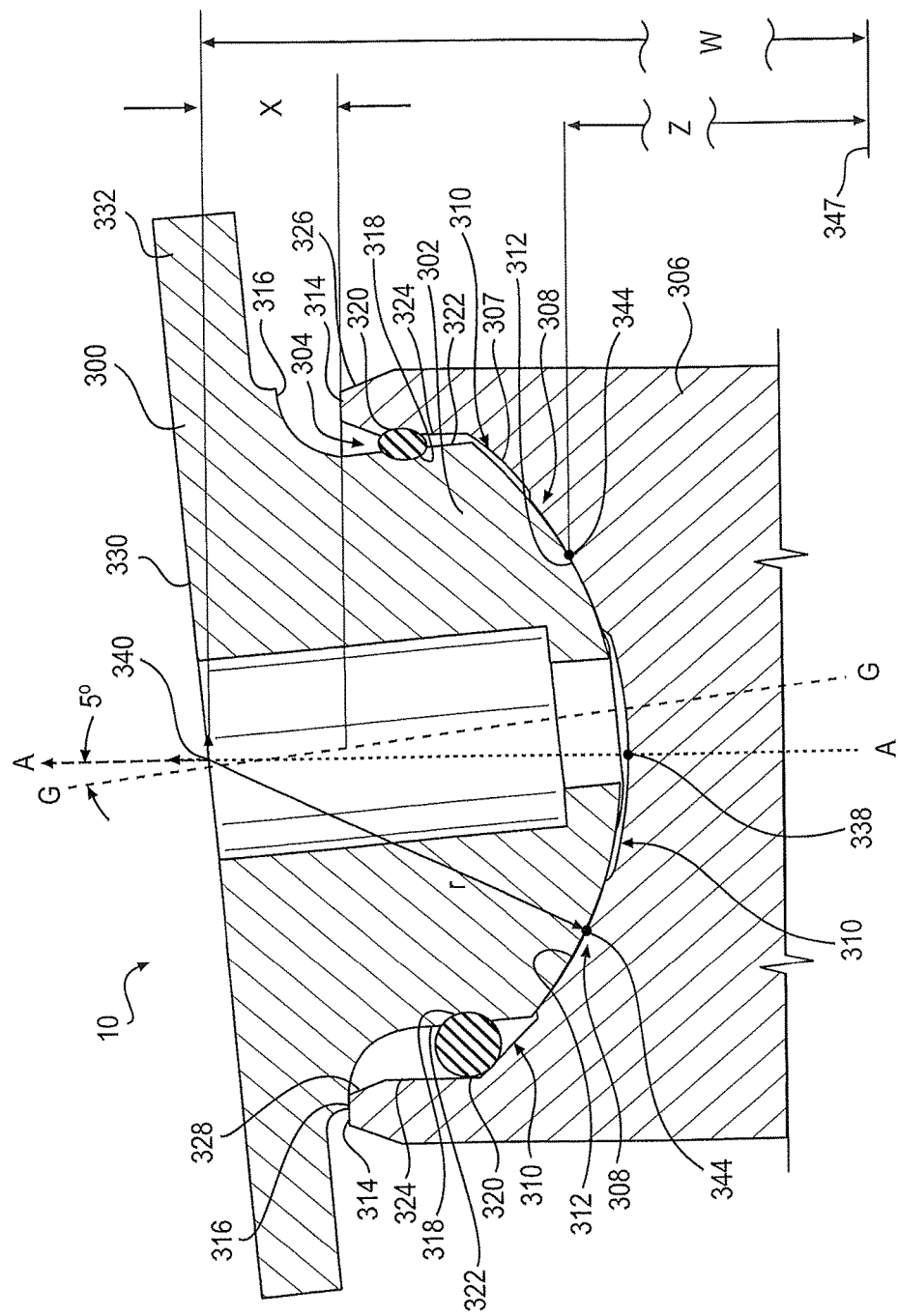
FIG. 13 is a cross-sectional view of a partial cylinder assembly having a swivel cap and socket in accordance with another embodiment.

FIG. 13 illustrates a cross-sectional view of a cylinder assembly 10 which may include a swivel cap 300 having an at least partially convex, arcuate (aka spherical) projection 302. The projection 302 is placed in a receiving cup or socket portion 304 of the rod 306. In some embodiments, the rod 306 is a piston rod similar to the piston rod 30 described above. In other embodiments, the rod 306 may be a combination rod and piston as will be described in more detail below with respect to FIG. 17.

The rod 306 includes a concave arcuate bottom surface 307 located in the receiving cup or socket portion 304. In some optional embodiments, the bottom surface 307 may have a raised portion 308. The raised portion 308 may perform a similar function as the raised regions 100 shown and described with respect to FIG. 3. Similar to that shown in FIG. 3, the embodiment shown in FIG. 13 may also include voids 310 located between the bearing surface 312 of the cap 300 and the bottom surface 307. The rod 306 may also define an end face 314 or end portion 314. In some embodiments, a stop surface 316 may be provided on the flange portion 332 of the swivel cap 300. Embodiments equipped with the stop surface 316 may limit the amount that the swivel cap 300 may tilt within the socket portion 304. As shown at the left side of FIG. 13, the stop surface 316 is butted against the end face 314 thereby limiting how much the swivel cap 300 can tilt.

In some embodiments, the stop surface 316 and the end face 314 will be dimensioned to limit the tilting of the swivel cap 300 so that the swivel cap 300 axis G-G will not vary more than about 5° from the axis A-A of the cylinder assembly. Other embodiments may select a different amount of tilt that is permitted. One of ordinary skill in the art after reviewing this disclosure will know how to configure and dimension the stop surface 316 and the end face 314 in order to provide a desired maximum tilt angle.

The swivel cap 300 may also include a seal groove 318 located circumferentially about the projection 302. A resilient seal 320 may reside in the seal groove 318. In some embodiments, the resilient seal 320 may be an O-ring which provides a sealing function to prevent dust, dirt, debris or any other unwanted substances from entering the voids 310, the bearing surface 312 of the cap 300 or the bottom surface 307 of the rod 306. In some embodiments, it may be desirable to prevent foreign objects from entering that area in order to allow the swivel cap 300 to swivel freely within the socket portion 304. In some embodiments, the resilient seal ring 320 will be compressed as shown in the right-hand side of FIG. 13 when the swivel cap 300 is tilted. The resilient material 320 will be biased to return to its original shape and thus providing a force to return the swivel cap 300 to a center position.

In contrast to the embodiments described above, the embodiment illustrated in FIG. 13 includes extended projection walls 322 located on the projection 302. Extended receiving cup or socket walls 324 may be provided on the rod 306. The combination of the extended projection walls 322 and an extended receiving cup or socket walls 324 permits the bearing surface 312 of the cap 300 and the raised portion 308 of the socket 304 to be deeper than some of the other embodiments described above for a given radius r.

Figure 16:
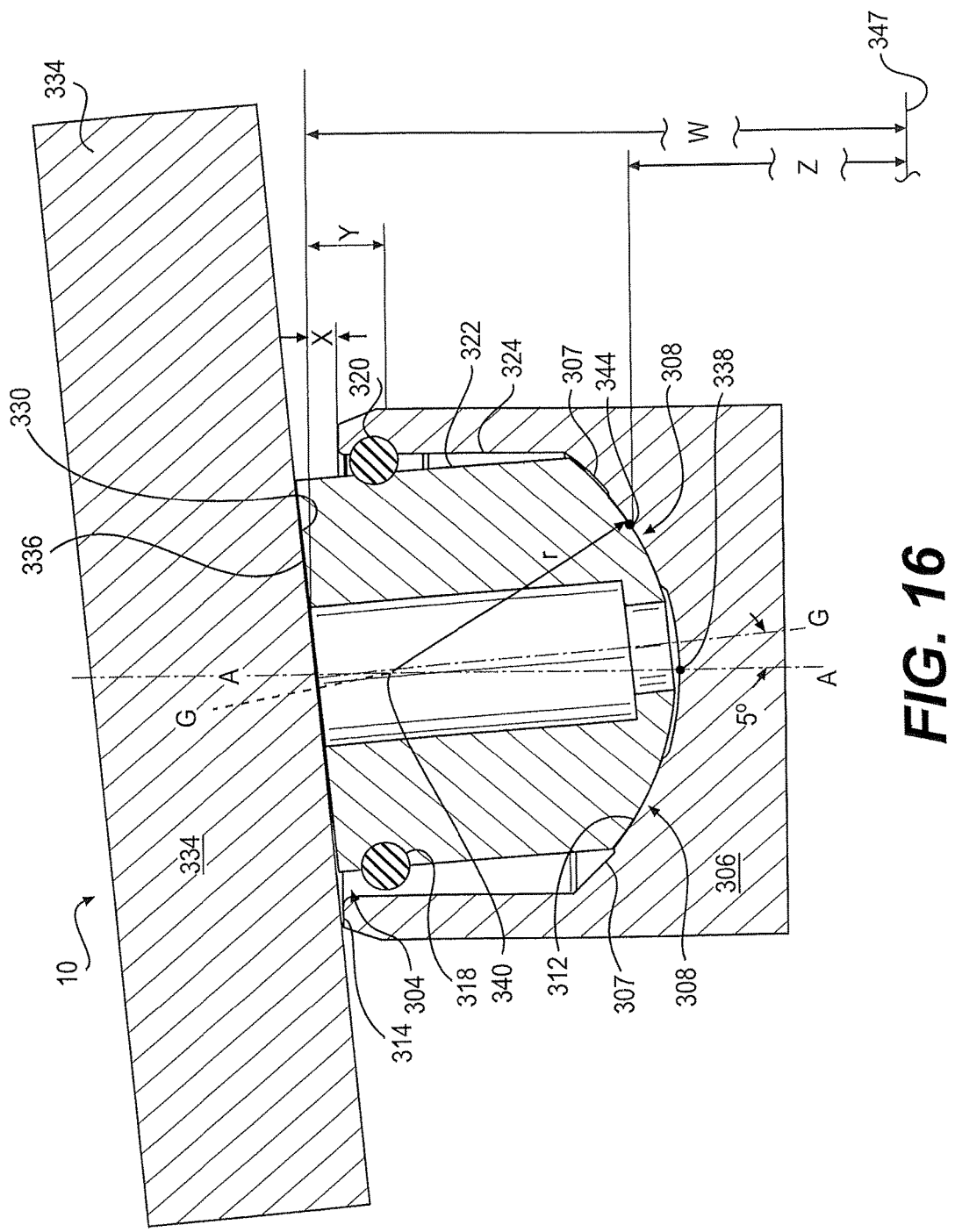
FIG. 16 is a cross-sectional view of a partial cylinder assembly having a swivel cap and socket in accordance with another embodiment.
Figure 17:
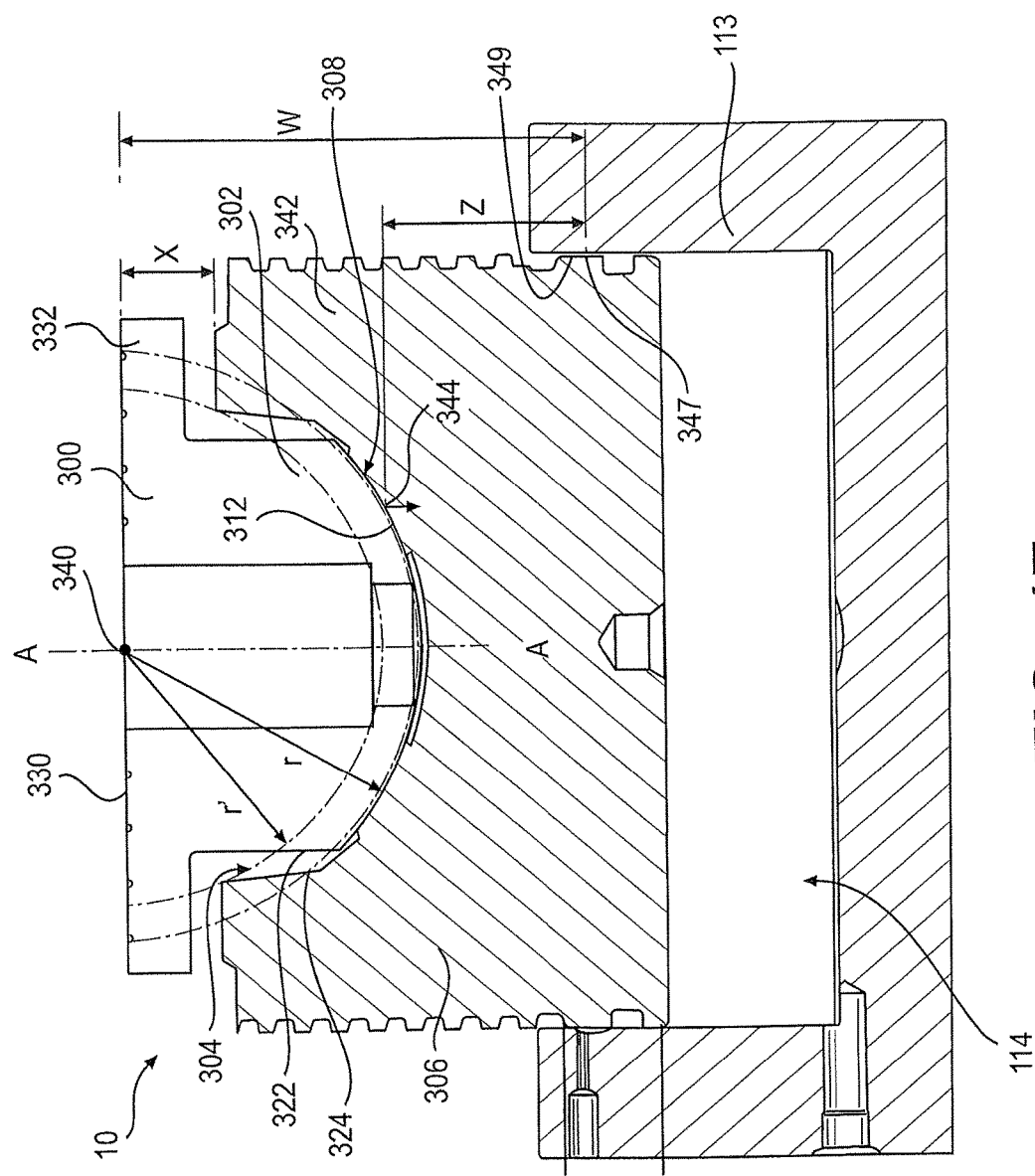
FIG. 17 is a cross-sectional view of a cylinder assembly having a swivel cap and socket in accordance with another embodiment.

One reason why it may be desirable to have the extended projection walls 322 and/or extended receiving cup or socket walls 324 is to reduce the distance from a load sitting on the top surface 330 of the swivel cap 300 to a bearing surface 349 of the piston 124, 342 as shown, for example, in FIGS. 5 and 17. This distance is represented by reference character W. It may also be desirable to reduce the difference between an average point 344 on the raised portion 308 of the bottom surface 307 of the receiving cup 304 and an average point 347 on the bearing surface 349 of the piston/rod combination 342 shown in FIG. 17. This distance is represented in FIGS. 13 through 17 by reference character Z. The distance between the top surface 330 of the swivel cap 300 and the end face or end portion 314 of the rod 306 is referred to as distance "X."

As stated above, hydraulic cylinders 10 at times experience bending moments or side loads. By reducing the distance between an average position 347 of the bearing surface 349 of the piston 124 (see for example FIG. 5) or piston/rod combination 342 of FIG. 17 and the load (distance W), and the distance between the average position 347 of the bearing surface 349 of the piston 124 or piston/rod combination 342 and the average position 344 of the bearing surface 312 of the rod 306 (distance Z, see FIG. 17) these bending moments or side loads may be reduced. Embodiments that have extended projection walls 322 on the swivel cap 300 and extended receiving cup or socket walls 324 in the rod 306 are able to maintain a bearing surface 312 defined by a given radius r while reducing the lengths W and Z when compared to embodiment such as that shown in FIG. 3. As mentioned above, reducing the lengths W and Z results in a shorter moment arm and thus smaller moment or side load on the piston 124 (see FIG. 5). Thus, a piston 124 equipped with the swivel cap 300 shown in FIG. 13 will exert a smaller side load due to a reduced moment arm then a swivel cap 60 shown in FIG. 3 having the same radius r.

Figure 14:
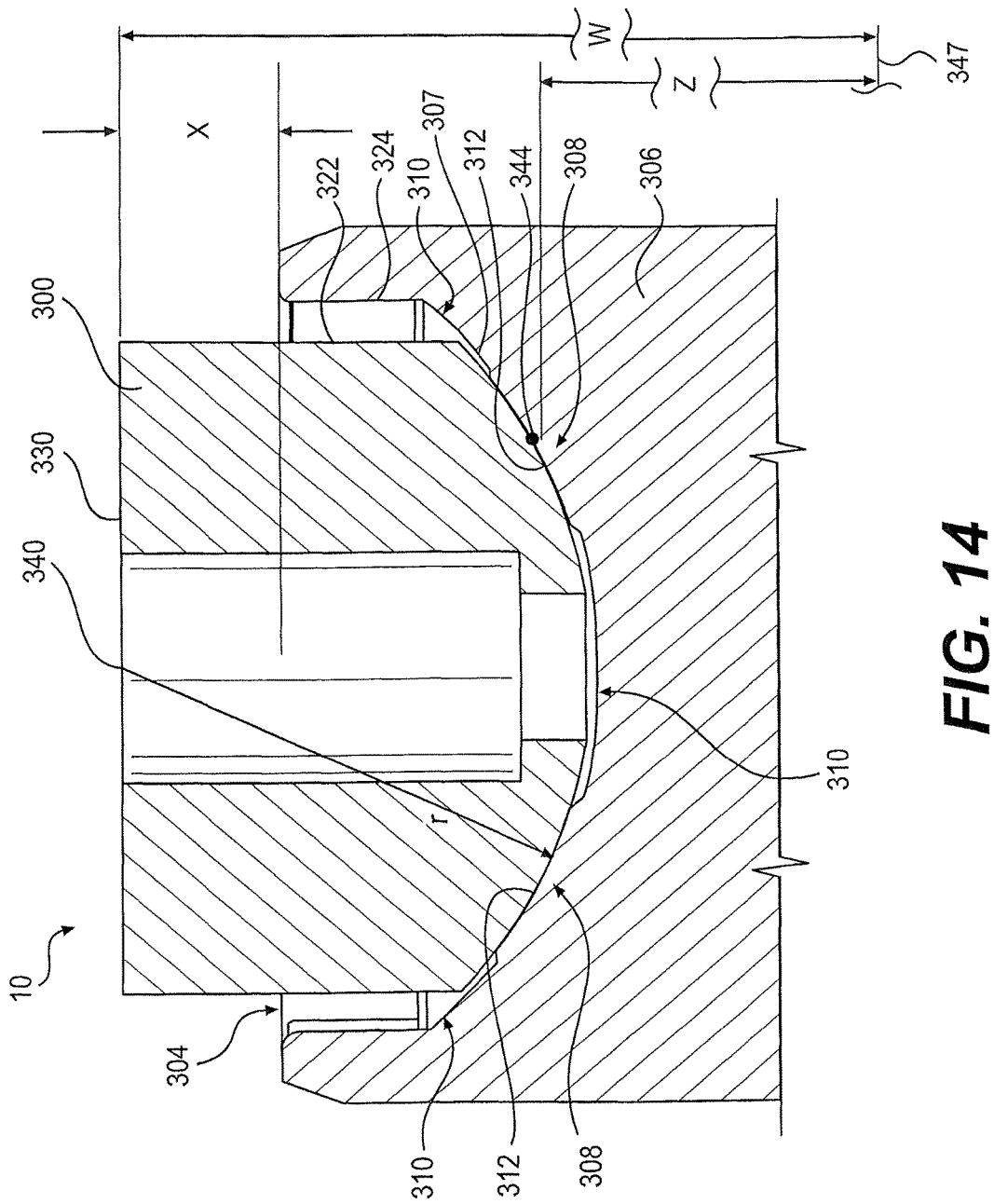
FIG. 14 is a cross-sectional view of a partial cylinder assembly having a swivel cap and socket in accordance with another embodiment.
Figure 15:
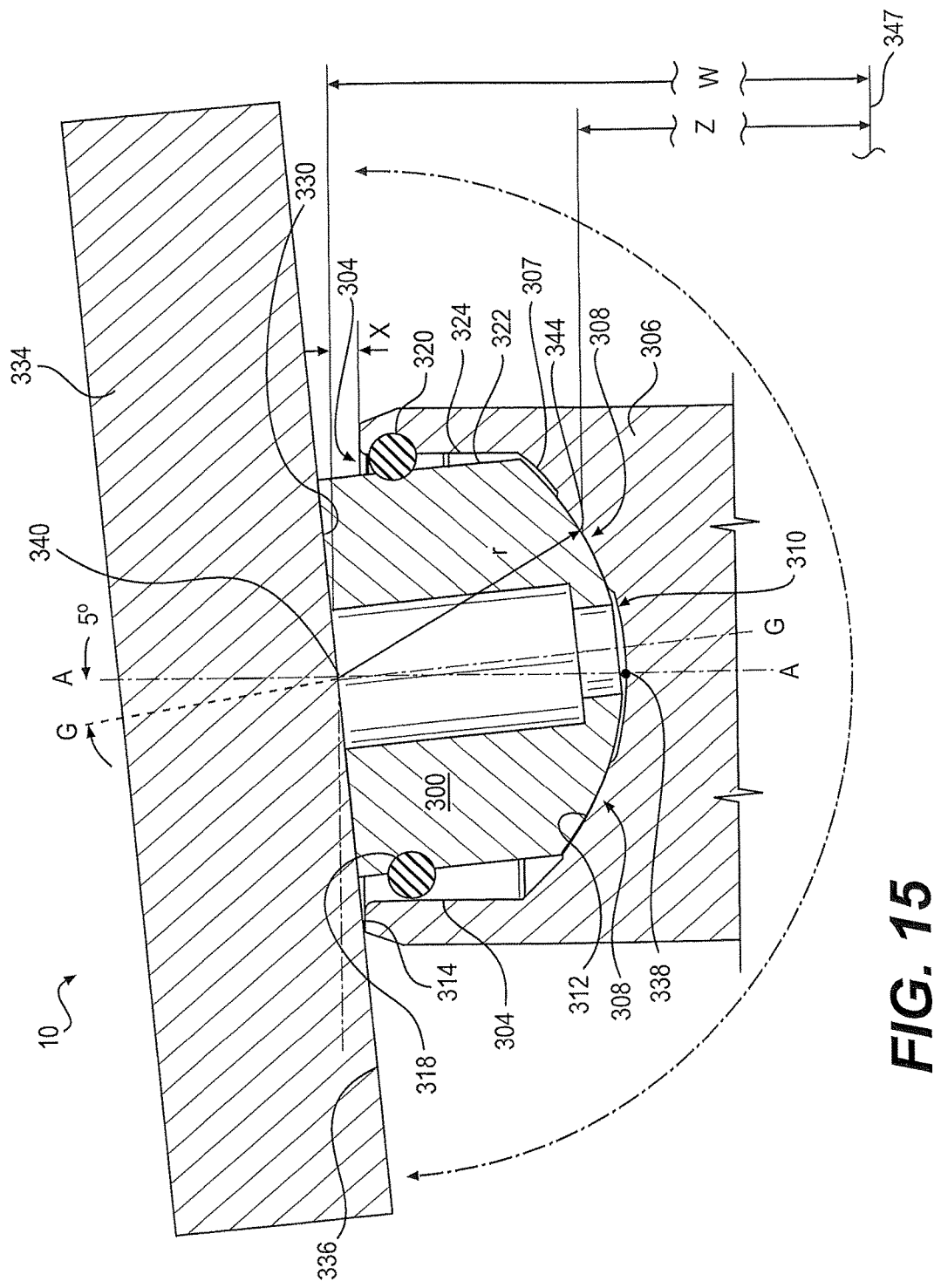
FIG. 15 is a cross-sectional view of a partial cylinder assembly having a swivel cap and socket in accordance with another embodiment.

FIGS. 14 and 15 shows an embodiment of a cylinder cap 300 and rod 306 similar to that shown in FIG. 13 with the exception that the cylinder cap 300 does not include the flange 332 and stop surface 316 shown in FIG. 13. FIGS. 14 and 15 illustrate a cross-sectional view of a cylinder assembly 10 which may include a swivel cap 300 having an at least partially spherical projection 302. The projection 302 is placed in a receiving cup or socket portion 304 of a rod 306. In some embodiments, the rod 306 is a piston rod similar to the piston rod described above. In other embodiments the rod 306 may be a combination rod and piston as will be described in more detail below with respect to FIG. 17.

The rod 306 includes a bottom surface 307 in the receiving cup or socket portion 304. In some optional embodiments, the bottom surface 307 may have a raised portion 308. The raised portion 308 may perform a similar function as the raised regions 100 shown and described with respect to FIG. 3. Similar to that shown in FIG. 3, the embodiment shown in FIGS. 14 and 15 may also include voids 310 located between the bearing surface 312 of the swivel cap 300 and the bottom surface 307.

The embodiment illustrated in FIGS. 14 and 15 includes extended projection walls 322 located on the projection 302. Extended receiving cup or socket walls 324 may be provided in the rod 306. The combination of the extended projection walls 322 and extended receiving cup or socket walls 324 permit the socket 304 to be deeper than some of the other embodiments described above for a given radius r. The lengths W, X, and Z are similar to that shown in the embodiment of FIG. 13.

FIG. 15 illustrates a load 334 located on the swivel cap 300. The load 334 in itself may act as a stop surface when the load 334 contacts the end face 314 as shown on the left-hand side of FIG. 15. The embodiment illustrated in FIGS. 14 and 15 may use the load itself 334 as the end stop rather than having an end stop 316 as shown in FIG. 13.

As shown in FIG. 15, the end surface 314 may be located and dimensioned so that it contacts the load 334 so that the axis G-G of the load is tilted no more than about 5° with respect to the axis A-A of the rod 306 as illustrated. This may be a similar maximum tilt angle as described above with respect to FIG. 13.

FIG. 15 also illustrates a slight modification over the embodiment of FIG. 14. FIG. 15 illustrates a resilient seal 320 located in the seal groove 318 of the swivel cap 300. The resilient seal 320 may provide a similar function as described above with respect to the embodiment of FIG. 13.

The embodiment illustrated in FIG. 16 is similar to the embodiments described above with respect to FIGS. 14 and 15. FIG. 16 illustrates a cross-sectional view of a cylinder assembly 10 which may include a swivel cap 300 having an at least partially spherical projection 302. The projection 302 is placed in a receiving cup or socket portion 304 of a rod 306. In some embodiments, the rod 306 is a piston rod similar to the piston rod described above. In other embodiments the rod 306 may be a combination rod and piston as will be described in more detail below with respect to FIG. 17.

The rod 306 includes a bottom surface 307 in the receiving cup or socket portion 304. In some optional embodiments, the bottom surface 307 may have a raised portion 308. The raised portion 308 may perform a similar function as the raised regions 100 shown and described with respect to FIG. 3. Similar to that shown in FIG. 3, the embodiment shown in FIGS. 14 and 15 may also include voids 310 located between the bearing surface 312 of the cap 300 and the bottom surface 307.

The embodiment illustrated in FIG. 16 includes extended projection walls 322 located on the projection 302. FIG. 16 illustrates a resilient seal 320 located in the seal groove 318 of the swivel cap 300. The resilient seal 320 may provide a similar function as described above with respect to the embodiment of FIG. 13. The bottom surface 336 of the load 334 rests on the top surface 330 of the end cap 300. The load 334 can act as a stop when it contacts the end face or end portion 314 of the rod 306. Similar to the embodiments described above. The dimensions of the rod 306 and end face 314 may be selected so that the maximum tilt angle of the load 334, as illustrated by axes A-A and G-G is about 5°. While the maximum tilt angle described herein is about 5°, one of ordinary skill in the art after reviewing this disclosure will understand how to configure and dimension the rod 306, the end face 314 and the distance X in a particular embodiment to achieve any other maximum tilt angle.

One difference between the embodiment illustrated in FIG. 16 and the previously described embodiments is that the swivel cap 300 pivot point 340 not located on the top surface 330 of the swivel cap 300 like the previous embodiments. Rather, the pivot point 340 is located within the swivel cap 300. The point 340 is also the origin for the radius r for FIGS. 13-17.

In some embodiments and as shown in FIG. 16, having the pivot point 340 and origin of radius r at point 340 located within the swivel cap 60 may result in extended receiving cup or socket walls 324 being extra long and extra long corresponding projection walls 322. The extended receiving cup or socket walls 324 in the embodiment shown in FIG. 16 are even longer than those illustrated with respect to FIGS. 13 through 15 for given radius r. Reference character "Y" refers to a distance between the location of the pivot point 340 which also is the radius r origin 340 and the top surface 330 of the swivel cap 300. The length Z is reduced by the distance Y in the embodiment of FIG. 16 when compared to the embodiment shown in FIGS. 13 through 15. Which results in the moment arm between the load 334 in the piston bearing surface being reduced.

FIG. 17 illustrates an embodiment where the rod 306, and the piston 124 are unitized into a single piston/rod combination 342. The cylinder 113 defines an interior space 114. The piston/rod combination 342 has a bearing surface 349 where the piston/rod combination 342 contacts the cylinder 113. A swivel cap 300 similar to that shown and described with respect to FIG. 13 which has a flange 332 is shown in FIG. 17. However, this should not be regarded as limiting as the embodiment of FIG. 17 may be adapted to be used with a variety of swivel caps 300. For example, swivel caps 300 similar to those shown in FIGS. 13 through 16 may be adapted for use in the embodiment shown in FIG. 17.

The at least partially spherical projection 302 of the swivel cap 300 is defined by radius r originating from the radius origin point 340 to the outer surface (of the bearing surface 312) of the at least partially spherical projection 302 similar to what is described above. A second radius r' is illustrated to demonstrate that a shorter radius r' would be used in a swivel cap 300 of the size shown in FIG. 17 if the swivel cap 300 did not have extended projection walls 322 and the extended receiving cup or socket portion walls 324. Thus, FIG. 17 illustrates an advantage that the extended projection walls 322 and receiving cup wall 324 provide: namely being able to use a longer radius defining the spherical projection 302 of the swivel cap 300. Having a longer radius r provides the advantage of reducing distance W and Z which results in reducing the moment arm of any side loads.

FIG. 17 illustrates a piston assembly 10 that has a relatively small distance W and distance Z when compared to other embodiments. As result, the embodiment illustrated in FIG. 17 will have much reduced side loads due to a shorter moment arm between a load sitting on the top surface 330 of the end cap 300 and an average point 347 of the piston bearing surface 349.

The many features and advantages of the disclosure are apparent from the detailed specification, and, thus, it is intended by the appended claims to cover all such features and advantages of the disclosure which fall within its true spirit and scope. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A swivel assembly for an actuator comprising:
a rod defining a socket, the rod defining an arcuate surface at a floor of the socket;
a cap dimensioned to fit into the socket, the cap defining a convex arcuate surface dimensioned to correspond to the arcuate surface of the floor of the socket;
a first extended surface defined by the rod, the first extended surface, defined at least in part, by side portions of the socket having a cylindrical wall projecting vertically upward from an edge of the socket and providing depth to the socket;
a second extended surface defined by the cap providing an extended length to the cap to allow the cap to extend out of the socket when the convex arcuate surface of the cap contacts the arcuate surface of the floor of the socket;
a flange integral to the cap and extending past the second extended surface on the cap, a lower surface of the flange having a tilt stop structure defined by an annular step disposed between the cap and the lower surface of the flange;
an end surface of the rod and a lower surface of the tilt stop structure located on the cap between the second extended surface and an end of the flange wherein when the cap tilts within the socket, the lower surface of the tilt stop contacts an end surface of the rod thereby preventing the cap from tilting at greater than a predetermined amount; and a cylinder assembly operatively connected to a piston and the cap to permit the piston and the cap to move axially along a longitudinal axis of the cylinder assembly to move inwardly and outwardly of the cylinder assembly.

2. The swivel assembly of claim 1, wherein the piston is integrated with the rod.

3. The swivel assembly of claim 1, wherein the rod is a rod operatively connected to the piston and the cap.

4. The swivel assembly of claim 3, a top surface defined by the cylinder cap.

5. The swivel assembly of claim 4, wherein the convex arcuate surface is at least partially spherical, the spherical portion having a radius having an origin located on the top surface of the cap.

6. The swivel assembly of claim 4, further comprising an end surface of the rod and wherein the first extended surface and the second extended surface are dimensioned so that the top surface of the cylinder cap extends about 1.0 inch above the end surface of the rod.

7. The swivel assembly of claim 4, wherein the convex arcuate surface is at least partially spherical, the spherical portion having a radius having an origin located below the top surface of the cap.

8. The swivel assembly of claim 7, wherein the convex arcuate surface is at least partially spherical, the spherical portion having an origin located about 0.5 inch below the top surface of the cap.

9. The swivel assembly of claim 4, further comprising an end surface of the rod and the first and second extended surfaces are dimensioned so that when the cap is located in the socket, the top surface extends above the end surface of the rod is a sufficient distance such that a load located on the top surface and extending beyond the top surface will contact the end surface of the rod if the cap tilts greater than a predetermined distance.

10. The swivel assembly of claim 9, wherein the predetermined distance is about 5° from a center position where the top surface is substantially parallel to the end surface of the rod.

11. The swivel assembly of claim 1, wherein the predetermined amount is 5° from a center position where the top surface is substantially parallel to the end surface of the rod.

12. The swivel assembly of claim 1, further comprising an annular seal groove in at least one of the first and second extended surface.

13. The swivel assembly of claim 12, further comprising a resilient material located in the seal groove.

14. The swivel assembly of claim 1, further comprising a projection in the arcuate surface at the floor of the socket in the rod wherein the projection provides a bearing surface configured to contact the convex arcuate surface of the cap.

15. A method of reducing a bending moment in a cylinder assembly comprising:

providing a first extended surface to an elongated socket, the first extended surface having a cylindrical wall projecting vertically upward from an edge of the elongated socket to give the socket additional depth into a rod;

providing a second extended surface on a cap having a convex arcuate surface and dimensioning the second extended surface and the convex arcuate surface to fit into the elongated socket;

providing a flange integral to the cap and extending past the second extended surface on the cap, a lower surface of the flange having a tilt stop structure defined by an annular step disposed between the cap and the lower surface of the flange;

providing an end surface of the first extended surface and a lower surface of the tilt stop structure located on the cap between the second extended surface and an end of the flange wherein when the cap tilts within the socket, the lower surface of the tilt stop contacts an end surface of the rod thereby preventing the cap from tilting at greater than a predetermined amount;

placing the cap into the elongated socket;

providing a top surface on the cap;

operatively connecting the first and cap to a piston and cylinder assembly wherein the piston has a bearing surface against the sidewall of the cylinder assembly; and orienting the elongated socket to minimize a distance between the top surface of the cap and the bearing surface of the piston when the cap is located in the elongated socket.

16. The method of claim 15, further comprising sealing a connection between the piston and cylinder assembly.

17. The method of claim 15 further comprising dimensioning the convex arcuate surface to have a radius wherein the radius originates at least one of on and below the top surface of the cap.

\* \* \* \* \*